(12) United States Patent
Kasahara

(10) Patent No.: US 6,829,433 B2
(45) Date of Patent: *Dec. 7, 2004

(54) ELECTROSTATIC ACTUATOR AND CAMERA MODULE USING ELECTROSTATIC ACTUATOR

(75) Inventor: Akihiro Kasahara, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/646,732

(22) Filed: Aug. 25, 2003

(65) Prior Publication Data

US 2004/0036379 A1 Feb. 26, 2004

Related U.S. Application Data

(62) Division of application No. 09/964,699, filed on Sep. 28, 2001, now Pat. No. 6,713,939.

(30) Foreign Application Priority Data

Sep. 28, 2000 (JP) .................................. P2000-296355

(51) Int. Cl.[7] .............................................. H02N 1/00
(52) U.S. Cl. ...................... 396/75; 310/309; 348/374; 396/439; 396/661
(58) Field of Search ................. 310/309, 12; 318/116; 396/75, 661, 439, 122; 348/374

(56) References Cited

U.S. PATENT DOCUMENTS

| | | | |
|---|---|---|---|
| 5,235,225 A | 8/1993 | Colgate et al. | 310/12 |
| 6,134,057 A | 10/2000 | Ueyama et al. | 359/821 |
| 6,181,050 B1 | 1/2001 | Taussig et al. | 310/309 |
| 2001/0028203 A1 | 10/2001 | Kasahara et al. | 310/309 |
| 2002/0036443 A1 | 3/2002 | Akiba et al. | 310/309 |
| 2002/0037171 A1 | 3/2002 | Kasahara | 396/661 |
| 2002/0050764 A1 | 5/2002 | Koga et al. | 310/309 |
| 2002/0074896 A1 | 6/2002 | Kasahara | 310/309 |
| 2002/0106204 A1 | 8/2002 | Miyamaru | 396/89 |

FOREIGN PATENT DOCUMENTS

| | | | |
|---|---|---|---|
| JP | 05-260766 | 10/1993 | H02N/1/00 |
| JP | 10-239578 | 9/1998 | G02B/7/04 |
| JP | 10-239740 | 9/1998 | G03B/15/05 |
| JP | 11-004803 | 1/1999 | G02B/7/04 |
| JP | 11-281870 | 10/1999 | G02B/7/04 |

OTHER PUBLICATIONS

A. Koga et al., "Electrostatic Linear Microactuator Mechanism For Focusing a CCD Camera", Journal of Lightwave Technology, vol. 17, No. 1, Jan. 1999, pp. 43–47.

"Attachment/Detachment Electrostatic Micro Actuators for Pan–Tilt Drive of a Micro CCD Camera", Koga et al., Jan. 1996.

"Electrostatic Linear Micro Actuators with Vibrating Motion for Pan–Tilt Drive of a Micro CCD Camera", Koga et al., Jan. 1996.

Translation of JP 5–260766, Nishiguchi et al., Oct. 1993.

*Primary Examiner*—Karl Tamai
(74) *Attorney, Agent, or Firm*—Oblon, Spivak, McClelland, Maier & Neustadt, P.C.

(57) ABSTRACT

An electrostatic actuator includes first and second electrode portions disposed at predetermined intervals, each electrode portion including one or more series of electrodes arranged successively in a predetermined direction; a slider disposed between the first and second electrode portions and having electrode portions at side faces opposed to the first and second electrode portions, the slider being movable in the predetermined direction; an electrostatic capacitance detecting circuit configured to detect electrostatic capacitances between each series of electrodes of the first and second electrode portions and the electrode portions of the slider; and a driving circuit configured to drive the slider in the predetermined direction by applying voltages between selected series of electrodes of one of the first and second electrode portions and the electrode portions of the slider, said selected series of electrodes being selected based on a detected result of the electrostatic capacitance detecting circuit.

6 Claims, 26 Drawing Sheets

ELECTROSTATIC ACTUATOR AND CAMERA MODULE USING ELECTROSTATIC ACTUATOR

CROSS-REFERENCE TO RELATED APPLICATIONS

This application is a Divisional of U.S. patent application Ser. No. 09/964,699 filed Sep. 28, 2001 now U.S. Pat. No. 6,713,939, and claims priority to Japanese Patent Application No. 2000-296355, filed Sep. 28, 2000, the entire contents of each of which are incorporated herein by reference in their entirety.

BACKGROUND OF THE INVENTION

1. Field of the Invention

The present invention relates to an electrostatic actuator driven by electrostatic force and a camera module using the electrostatic actuator.

2. Discussion of the Background

Heretofore, as an electrostatic actuator, there has been proposed a constitution of a type shown in, for example, FIG. 26 (for example, refer to Japanese Patent Laid-Open No. 140367/1996). A conventional electrostatic actuator shown in FIG. 26 is constituted by a slider (or movable section) 101 and two stators 102 and 103 sandwiching the slider 101 from above and from below. The respective stators 102 and 103 are arranged with two series of electrodes 102a, 102b, 103a and 103b and a total of four series of electrodes are provided by upper and lower sets of the stators. Further, the slider 101 is provided with electrode portions 101a and 101b formed in a projected shape to be opposed to the electrodes of the stators.

Further, pitches and electrode widths of the respective electrodes 102a, 102b, 103a and 103b provided at the stators 102 and 103 and the electrode portions 101a and 101b provided at the slider 101 are respectively the same. Further, in the stators 102 and 103, the respective electrodes are arranged alternately such that two series of the electrodes respectively appear in turn in a predetermined direction. Further, the upper electrodes 102a and 102b of the stator 102 and the lower electrodes 103a and 103b of the stator 103, are arranged such that phases of aligning pitches thereof are shifted from each other exactly by ½.

Here, when voltage is applied between the electrode 102a of the stator 102 and the slider 101, by electrostatic force (Coulomb force) operated between the electrode 102a and the electrode portion 101a provided at the slider 101, the slider 101 is attracted to the stator 102 (such that the electrode 102a and the electrode portion 101a overlap). Successively, when the applied voltage is switched to the electrode 103a of the stator 103, by electrostatic force (Coulomb force) operated between the electrode 103a and the electrode 101b provided at the slider 101, the slider 101 is attracted to the stator 103 (such that the electrode 103a and the electrode 101b overlap).

When the voltage applied to the electrodes on the stator side is successively switched such that the electrodes are activated in the order 102a→103a→102b→103b, the slider 101 is driven macroscopically in the predetermined direction (right side in the drawing) of alternately arranged electrodes of the stators while vibrating upwardly and downwardly microscopically. When the order of applying the voltage to the electrodes of the stators is reversed such that the electrodes are activated in the order 102a→103b→102b→103a, the slider 101 is driven in a reverse direction (left side in the drawing) to the predetermined direction of alternately arranged electrodes of the stator.

However, according to such an arrangement, the following problem is posed. According to the conventional electrostatic actuator, driving force is changed depending on its altitude by influence of gravitational force and therefore, a distance of advancing the slider 101 in one step is changed. For example, when a direction of driving the slider 101 coincides with a vertical direction, in order to drive the slider 101 upwardly in the vertical direction, in applying voltage to the electrode of the stator, it is necessary to repeat the same step a plurality of times (for example, at a step of the electrode 102a→103a by a plurality of times). Therefore, in order to realize firm driving operation in correspondence with all the altitude, the actuator is driven under the severest condition and therefore, there poses a problem that voltage is applied more than necessary, moving speed is reduced and power consumption for driving is increased.

Further, in order to realize driving operation in the above-described predetermined direction, it is necessary to accurately control the phases in arranging the electrodes 102a and 102b provided at the stator 102 and the electrodes 103a and 103b provided at the stator 103, further, it is necessary to accurately fabricate the electrode portions at two faces of the slider 101 opposed to the electrodes. Therefore, the cost is high owing to time and labor required for assembling, which poses a problem in realizing mass production.

SUMMARY OF THE INVENTION

It is an object of the invention to provide an electrostatic actuator resolving such a problem, realizing efficient driving operation, easy to fabricate and excellent in mass production performance and provide a camera module for executing focal point adjusting operation by using the electrostatic actuator.

In order to resolve the above-described problem, according to an aspect of the embodiment of the invention, in an electrostatic actuator having first electrode portion and second electrode portion arranged at predetermined intervals, the electrode portions including respectively a plurality of series of electrodes arranging successively in a predetermined direction, a slider arranged in the intervals, having electrode portions at side faces opposed to the first electrode portion and the second electrode portion and movable in the predetermined direction, an electrostatic capacitance detecting circuit configured to detect electrostatic capacitances between the plurality of series of electrodes of the first electrode portion or the second electrode portion and the electrode portions of the slider, and a driving circuit configured to drive the slider in the predetermined direction by applying voltages alternately between the plurality of series of electrodes of the first electrode portion or the second electrode portion and the electrode portions of the slider, the plurality of series of electrodes respectively selected based on a detected result of the electrostatic capacitance detecting circuit.

Further, according to another aspect of the embodiment of the invention, in an electrostatic actuator having first electrode portion and second electrode portion arranged at predetermined intervals, the first electrode portion including three series or more of electrodes arranging successively in the predetermined direction and said second electrode portion including a single series of electrodes extended in the predetermined direction, a slider arranged at the intervals, having electrode portions at a side face opposed to the first electrodes and movable in the predetermined direction, an electrostatic capacitance detecting circuit configured to detect electrostatic capacitances between three series or more of electrodes of the first electrode portion and the electrode portions of the slider, and a driving circuit configured to drive the slider in the predetermined direction by applying voltages alternately between the three series or more of electrodes of the first electrode portion or the second electrode portion and the electrode portions of the slider, the three series or more of series of electrodes respectively selected based on a detected result of the electrostatic capacitance detecting circuit.

Further, according to another aspect of the embodiment of the invention, in an electrostatic actuator having first electrode portion and second electrode portion arranged at predetermined intervals, the first electrode portion and second electrode portion including a plurality of series of electrodes arranging successively in a predetermined direction, a slider arranged in the intervals, having electrode portions at side faces opposed to the first electrode portion and the second electrode portion and movable in the predetermined direction, an electrostatic capacitance detecting circuit configured to defect an electrostatic capacitance between one electrode of either of the first electrode portion or the second electrode portion and all of the electrodes of other thereof, and a driving circuit configured to drive the slider in the predetermined direction by alternately applying voltages between the plurality of series of electrodes of the first electrode portion and the second electrode portion and the electrode portions of the slider, the plurality of series of electrodes respectively selected based on a detected result of the electrostatic capacitance detecting circuit.

Further, according to the embodiments of the invention, there is also provided a camera module having photographing elements, an electrostatic actuator having a lens at one end face orthogonal to the predetermined direction of the slider or at inside thereof and controller configured to control to drive the slider.

DETAILED DESCRIPTION OF PREFERRED EMBODIMENTS

A detailed explanation [will be given] of embodiments of the invention will be given in reference to the drawings as follows.

(First Embodiment)

First, an explanation [will be] is given of a first embodiment of the invention in reference to FIG. 1 through FIG. 6.

Figure 1:
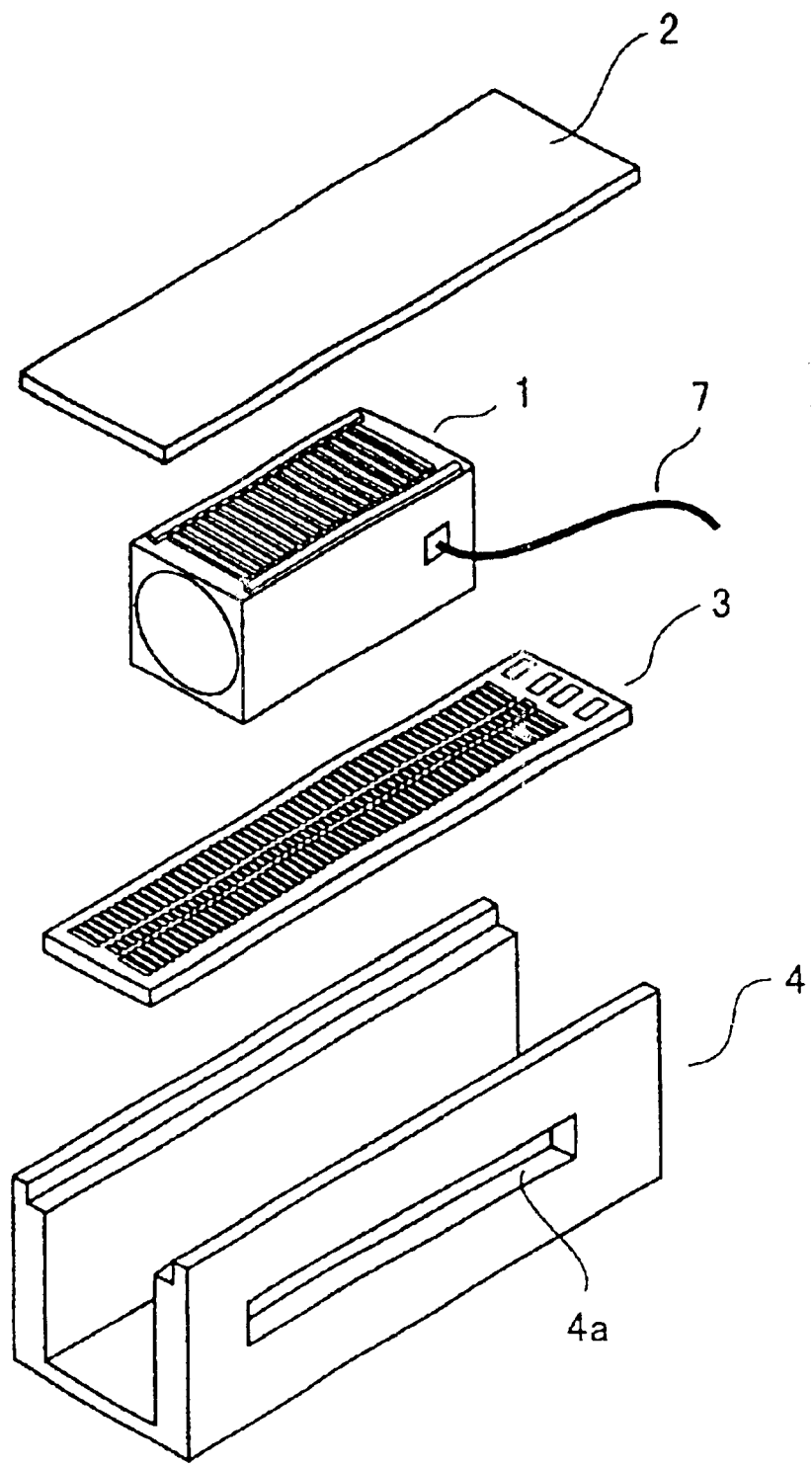
FIG. 1 is a disassembled perspective view showing a first embodiment according to the invention.

As shown by FIG. 1, an electrostatic actuator according to the invention is provided with a slider 1, a pair of stator 2 and stator 3 arranged to be opposed to each other to sandwich the slider 1 and a holder 4 for holding these elements.

Figure 2:
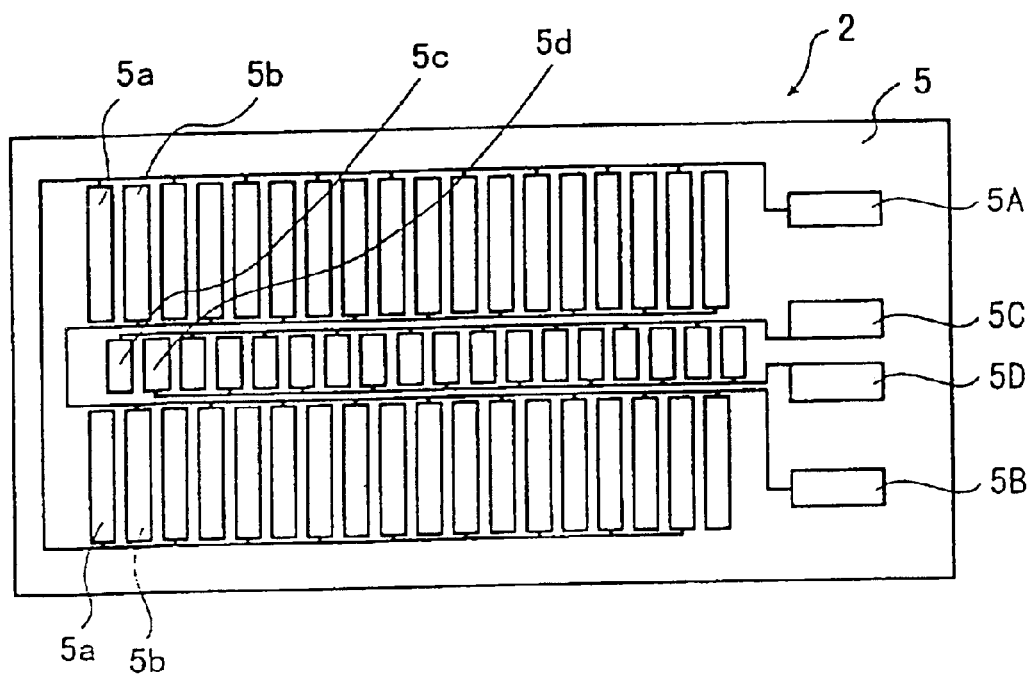
FIG. 2 is a constitution view of electrodes of a stator showing the first embodiment according to the invention.

FIG. 2 shows an outline of the stator 2. The stator 2 is provided with a main body portion 5 comprising a plate of a material having extremely high electric resistance (for example, glass) and there are formed four series of electrodes 5a, 5b, 5c and 5d (first electrodes) in a stripe-like shape on a face of the main body portion 5 opposed to the stator 3. In this case, the electrodes 5a and 5b are [electrodes] configured to drive the slider 1 (driving electrodes) and arranged alternately along a moving direction of the slider 1. Further, the electrodes 5c and 5d are electrodes constituting sensors configured to detect electrostatic capacitance (electrostatic capacitance detecting electrodes) and configured to determine when one electrode to be applied with voltage between the electrode and the slider 1 and the electrodes 5c and 5d are arranged alternately also along the moving direction of the slider 1. Further, at a side portion of the stator 2, there are provided pads 5A, 5B, 5C and 5D connected to the respective electrodes and connected with lead wires, not illustrated, for applying voltage from outside.

Further, as shown by FIG. 2, the electrodes 5a and 5b and the electrodes 5c and 5d are arranged such that phases of aligning pitches with regard to the moving direction of the slider 1 are shifted from each other by ½ and a total sum of areas of the electrodes 5a and 5b are constituted to be larger than a total sum of areas of the electrodes 5c and 5d. This is for exerting sufficient drive force to the slider 1.

Further, the electrodes 5c and 5d constituting sensors configured to measure electrostatic capacitance may be provided by numbers the same as those of the electrodes 5a and 5b configured to drive the slider or may be provided by numbers smaller than those of the electrodes 5a and 5b. However, it is needed to provide the electrodes 5c and 5d by necessary numbers in correspondence with a stroke of the slider 1.

Further, although not illustrated, also the stator 3 is provided with a main body portion 6 comprising a plate of a material having extremely high electric resistance and there are formed four series of electrodes 6a, 6b, 6c and 6d (second electrodes) on a face of the main body portion 6 opposed to the stator 2. Further, there are provided pads 6A, 6B, 6C and 6D connected to the respective electrodes at a side portion of the stator 3 and connected with lead wires, not illustrated, for applying voltage from outside. The other constitution is similar to that of the above-described stator 2.

The stators 2 and 3 are fixed to the holder 4 at an interval therebetween and the slider 1 is inserted between the stators 2 and 3. At this occasion, clearances are formed between the stators 2 and 3 and the slider 1. Further, the slider 1 is connected with a lead wire 7 and the electrical potential of the slider 1 can be adjusted from outside via the lead wire 7. Further, as shown by FIG. 1, the holder 4 may be provided with a hole portion 4a for leading out the lead wire 7 connected to the slider 1.

Two electrodes 5a and 5b (6a, 6b) on the stator 2 (3) are constructed by a structure constituted by forming a conductive film on the main body portion 5 (6) comprising, for example, a glass wafer and forming an insulating film, not illustrated, respectively on the conductive film. The conductive film may be formed by adhering a metal thin film or may be formed by piling up a metal thin film by using means of sputtering, vapor deposition or the like and patterning the metal thin film by using an etching process or the like. Further, the insulating film may be formed by adhering a thin sheet comprising a substance having high electric resistance on the conductive film or may be formed by piling up a silicon oxide film by using a sputtering method or a CVD method.

Figure 3:
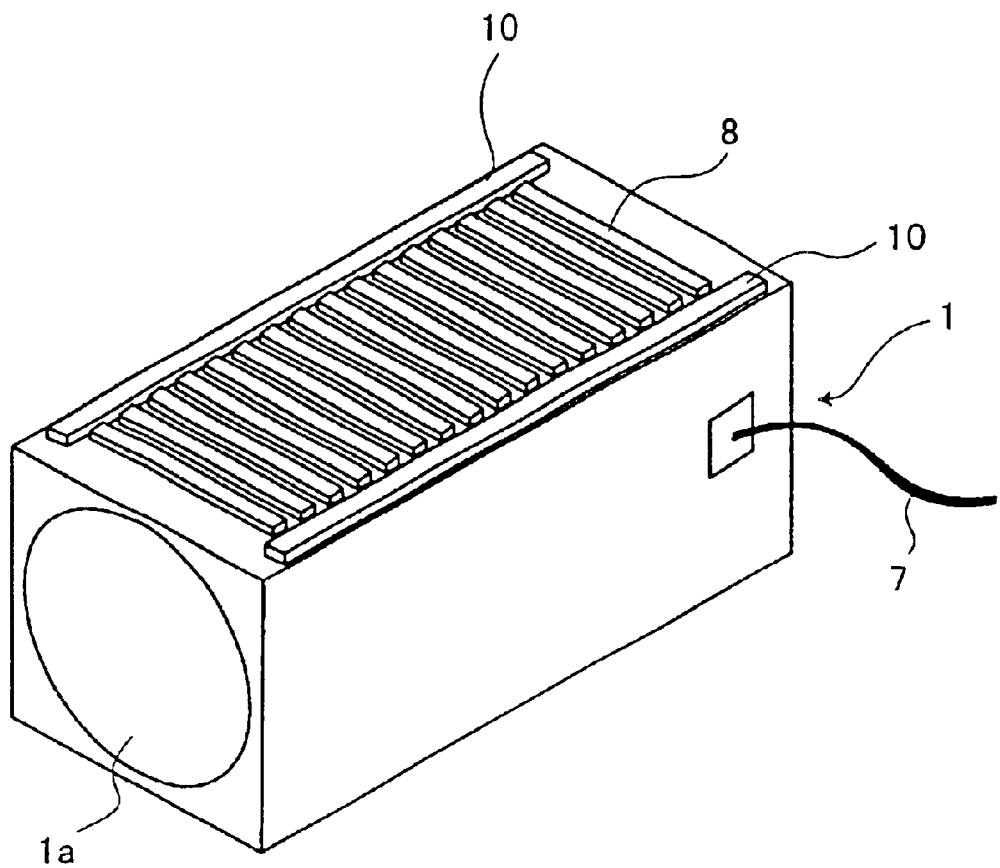
FIG. 3 is a perspective view of a slider showing the first embodiment according to the invention.

Meanwhile, as shown by FIG. 3, the slider 1 is formed by a conductor or a resistor and projected portions (electrode portions) 8 having an equal height are provided to a portion of the slider 1 at a position opposed to the electrodes 5a and 5b of the stator 2, further, although not illustrated, projected portions (electrode portions) 9 having an equal height is provided at a portion of the slider 1 at a position opposed to the electrodes 6a and 6b of the stator 3, in a stripe-like shape respectively along the moving direction of the slider 1.

Figure 4:
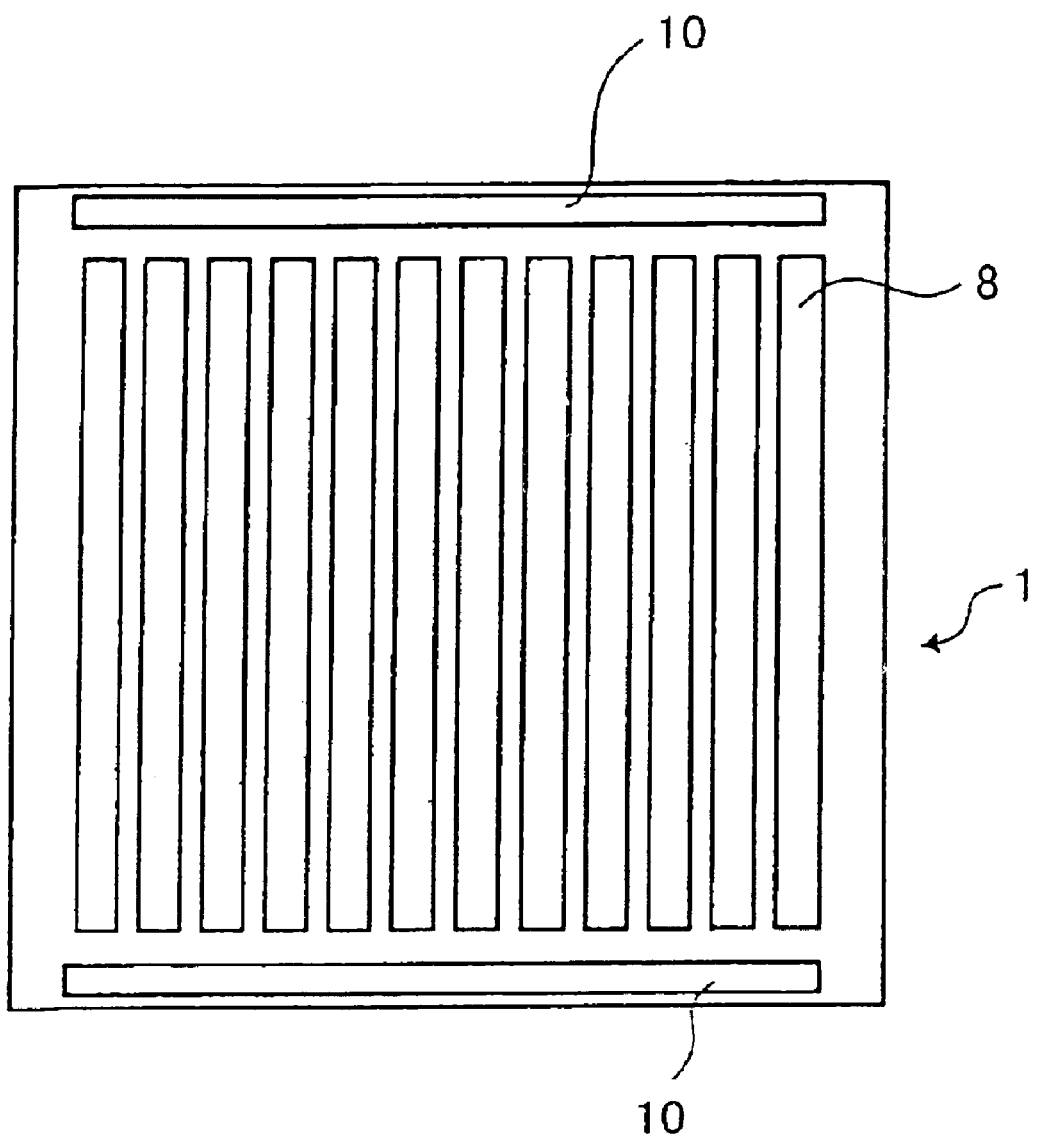
FIG. 4 is a plane view of the slider showing the first embodiment according to the invention.

Or, the slider 1 may be configured such that the slider 1 is formed by an insulator or provided with an insulating film on its surface and as shown by FIG. 4, conductors (electrode portions) 8 are provided at a portion of the slider 1 at a position opposed to the electrodes 5a and 5b of the stator 2, further, although not illustrated, conductors (electrode portions) 9 are provided at a portion of the slider 1 opposed to the electrodes 6a and 6b of the stator 3 and the conductors (electrode portions) 8 and 9 are electrically connected.

Further, slider 1 is provided with stoppers 10 more or less higher than electrode portions 8 and 9 and is constituted such that the electrode portions 8 and 9 and the electrodes 5a, 5b, 6a and 6b are prevented from being brought into direct contact with each other.

Further, when the electrostatic actuator according to the embodiment is utilized as a focal point adjusting mechanism of a small-sized camera, a lens 1 a may be provided at an end face or at inside of the slider 1.

Figure 5A:
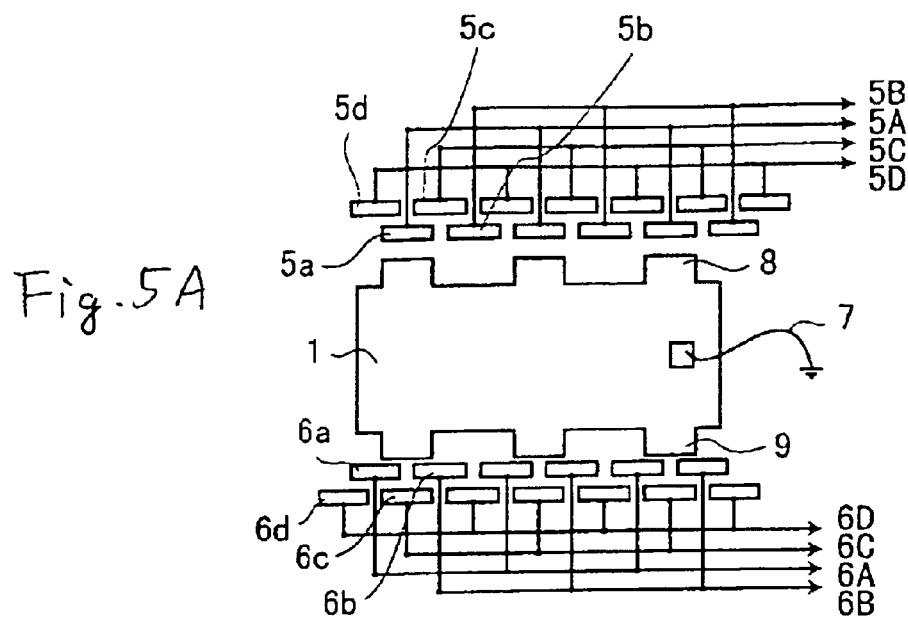
FIGS. 5A, 5B and 5C are views configured to explain a drive pattern showing the first embodiment according to the invention.
Figure 5B:
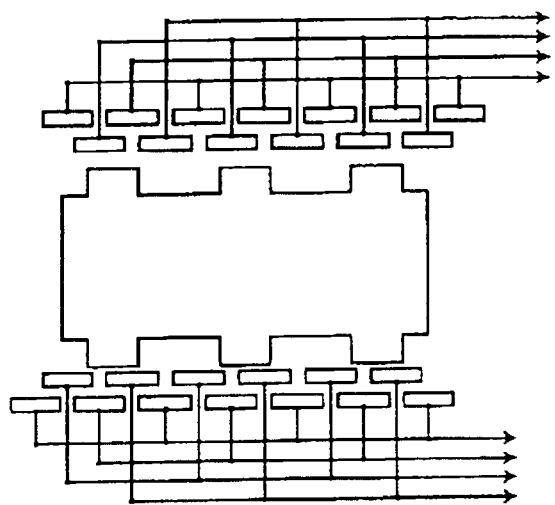
Figure 5C:
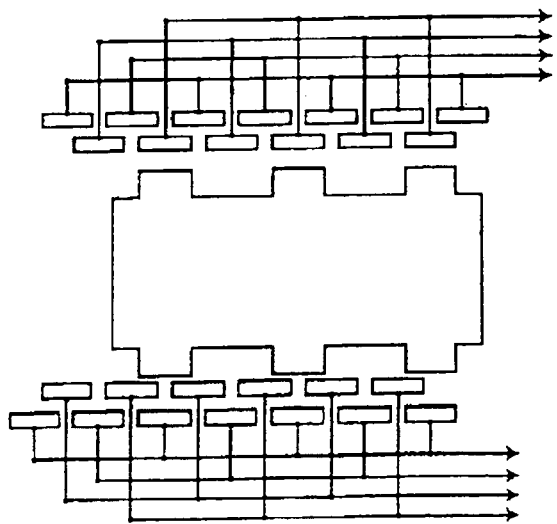

Next, an explanation will be given of operation of the electrostatic actuator according to the embodiment in reference to FIGS. 5A, 5B and 5C and FIG. 6. FIGS. 5A, 5B and 5C show a behavior of moving the slider 1 in the moving direction (right side in the drawing). Here, for explanation, only electrodes of the stators 2 and 3 are schematically shown. Further, the electrical potential of the slider 1 is always set to 0 (grounded via lead wire 7).

All of FIGS. 5A through 5C [illustrated], show states in which voltage is applied between the electrodes on the slider 1 and the stator 3 and the slider 1 is attracted to the side of the stator 3. In the case in which the slider 1 is disposed from a position slightly on the right side of the state of FIG. 5A to a position immediately before a state of FIG. 5C after passing through a state of FIG. 5B, when voltage is applied to the electrodes 5b, the slider 1 is moved to the right side of the drawing while moving to the side of the stator 2.

That is, the pitch of the electrode portions 8 of the slider 1 substantially coincides with the pitch of the electrodes 5a (or 5b) and when voltage is applied to the electrodes disposed on the right side of right above the electrode portions 8 (in the case of FIGS. 5A through 5C, the electrodes 5b), the slider 1 can be moved to the right side. Conversely, although not illustrated, when voltage is applied to the electrodes on the left side of right above the electrode portions 8, the slider 1 can be moved to the left side.

Similarly, although not illustrated, even in a state in which voltage is applied between the electrodes on the slider 1 and the stator 3 and the slider 1 is attracted to the side of the stator 3, by selecting electrodes to be applied with voltage for realizing the predetermined moving direction, the slider 1 is moved in the predetermined moving direction while moving to the side of the stator 3.

In this way, the slider 1 can contiguously be moved by alternately applying voltage between the electrodes on the stator 2 and the slider 1 and between the electrodes on the stator 3 and the slider 1.

Next, an explanation will be given of a method of selecting electrodes to be applied with voltage in reference to FIG. 6. An explanation will be given here of a method of selecting the electrodes on the stator 2.

Figure 6:
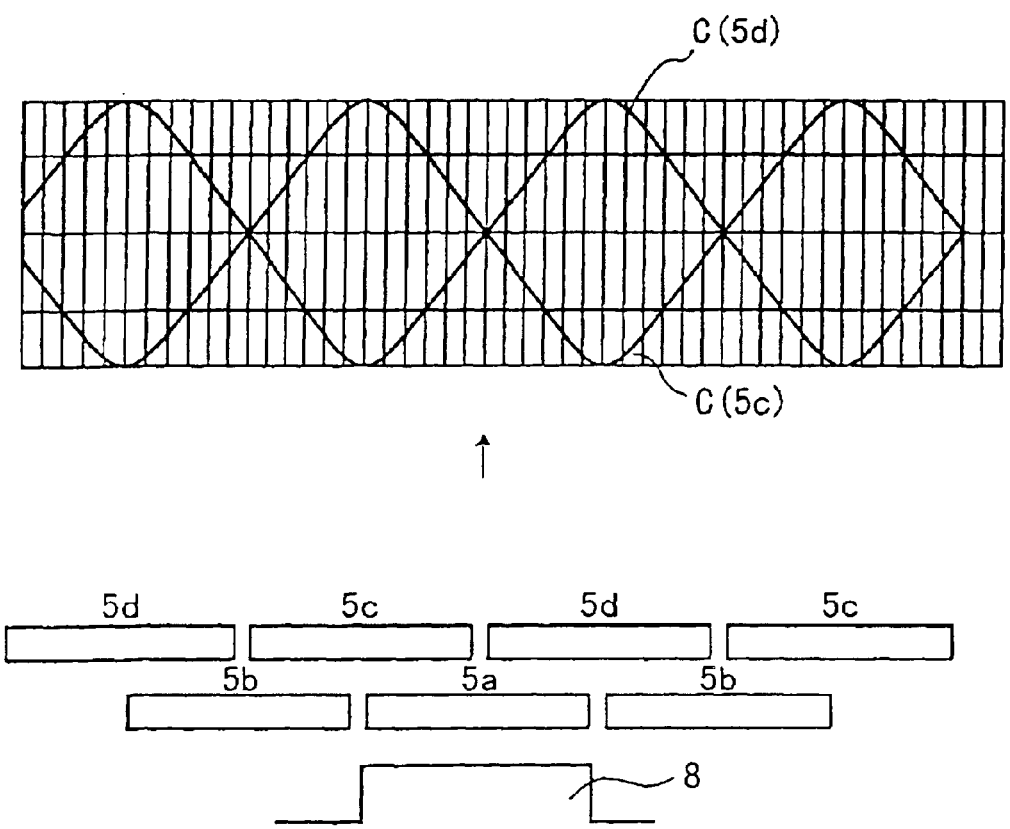
FIG. 6 is a diagram configured to explain the drive pattern showing the first embodiment according to the invention.

FIG. 6 shows a relationship between relative positions of the respective electrodes on the stator 2 relative to the electrode portion 8 of the slider 1, and electrostatic capacitance between the respective electrodes on the stator 2 and the electrode portion 8. As shown by the drawing, when the electrode portion 8 of the slider 1 is opposed to the electrode 5a (position of arrow mark in the drawing), distances from the electrodes 5c and 5d to the electrode portion 8 are equal to each other and electrostatic capacitance C (5c) between the electrode 5c and the electrode portion 8 and electrostatic capacitance C (5d) between the electrode 5d and the electrode portion 8 are equal to each other. Further, as the electrode portion 8 moves to the right side in accordance with movement of the slider 1, the electrostatic capacitance C (5c) is reduced and the electrostatic capacitance C (5d) is increased. When the electrode portion 8 is disposed at a middle of the electrodes 5a and 5b, the electrostatic capacitance C (5c) shows a minimum value and electrostatic capacitance C (5d) shows a maximum value. When the electrode portion 8 is moved further to the right side, the electrostatic capacitance C (5c) is conversely increased, the electrostatic capacitance C (5d) is reduced and at a position at which the electrode portion 8 is opposed to the electrode 5b, the electrostatic capacitance C (5c) and the electrostatic capacitance C (5d) coincide with each other again.

When the electrode portion 8 is moved further to the right side, the electrostatic capacitance C (5c) is further increased and the electrostatic capacitance C (5d) is further reduced. When the electrode portion 8 is disposed at a middle of the electrodes 5a and 5b, the electrostatic capacitance C (5c) shows a maximum value and the electrostatic capacitance C (5d) shows a minimum value. When the electrode portion 8 is moved further to the right side, the electrostatic capacitance C (5c) is conversely reduced, the electrostatic capacitance C (5d) is increased and the electrostatic capacitance C (5c) and the electrostatic capacitance C (5d) coincide with each other at a position at which the electrode portion 8 is opposed to the electrode 5a to thereby finish one cycle.

By utilizing the fact that the electrostatic capacitance is changed in this way, in driving the slider 1, an electrode to be applied with voltage can be selected. First, when the slider 1 is adsorbed onto the stator 3, voltage applied between the electrodes on the stator 3 and the slider 1 is set to 0. Further, when the slider 1 is moved to the right side, voltage is applied to the electrode 5b when the electrostatic capacitance is C (5c)<C (5d) and to the electrode 5a when the electrostatic capacitance is C (5c)>C (5d), respectively. Further, when the slider 1 is moved to the left side, voltage is applied to the electrode 5a when the electrostatic capacitance C (5c)<C (5d) and to the electrode 5b when the electrostatic capacitance is C (5c)>C (5d).

Similarly, although not illustrated, when the slider 1 is adsorbed onto the stator 2, voltage applied between electrodes on the stator 2 and the slider 1 is set to 0. Further, when the slider 1 is moved to the right side, voltage is applied to the electrode 6b when the electrostatic capacitance is C (6c)<C (6d) and to the electrode 6a when the electrostatic capacitance is C (6c)>C (6d). Meanwhile, when the slider is moved to the left side, voltage is applied to the electrode 6a when the electrostatic capacitance is C (6c)<C (6d) and to the electrode 6b when the electrostatic capacitance is C (6c)>C (6d), respectively.

Figure 7:
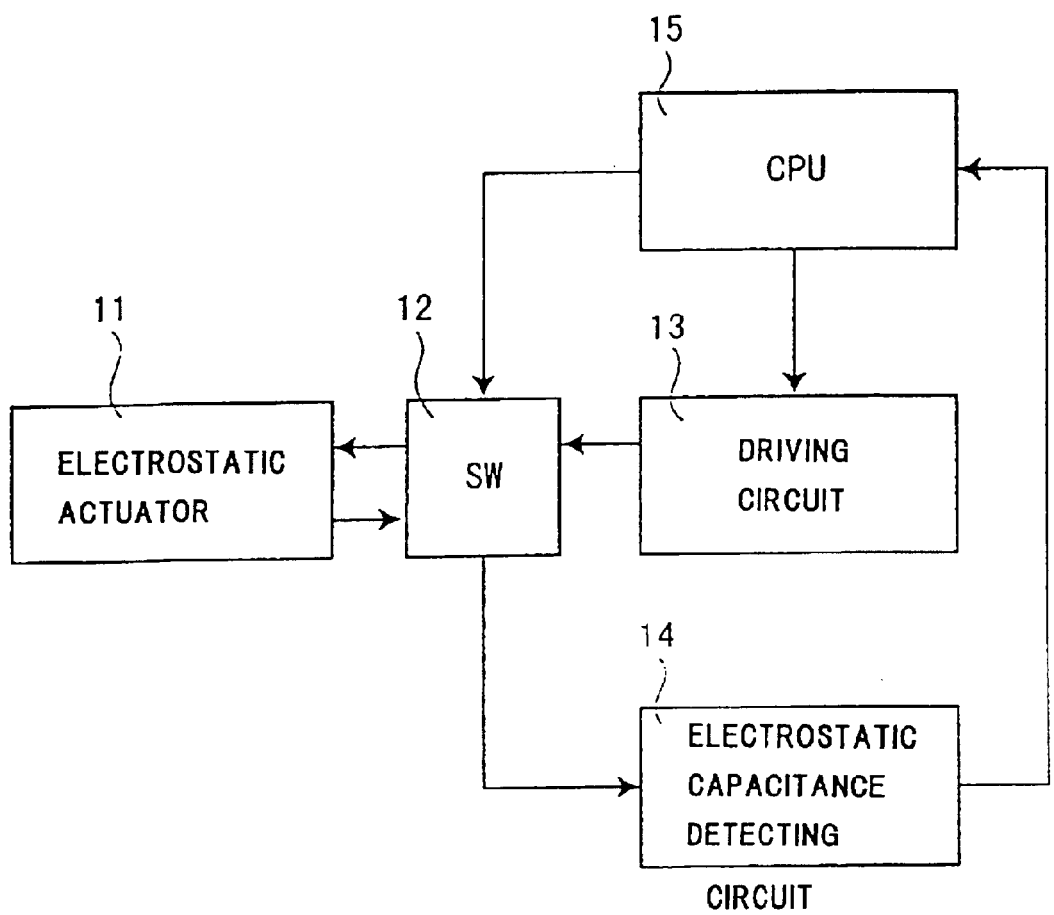
FIG. 7 is a system constitution diagram of an electrostatic actuator according to the invention.

FIG. 7 shows an outline constitution diagram of a system configured to control to drive the electrostatic actuator according to the embodiment by using the above-described method.

An electrostatic actuator 11 according to the embodiment is connected to a driving circuit 13 and an electrostatic capacitance detecting circuit 14 via a changeover switch 12. The changeover switch 12 is operated via CPU 15.

An explanation will be given here of an outline of an operational procedure of the system. First, the changeover switch 12 is connected to the electrostatic capacitance detecting circuit 14, electrostatic capacitance between a predetermined electrode on the stator and the electrode portion of the slider constituting the electrostatic actuator 11, is detected and a detected result is outputted to CPU 15. CPU 15 determines to which electrode on the stator voltage is applied based on the output, outputs the result to the driving circuit 13 and outputs a signal of switching the changeover switch 12 from the electrostatic capacitance detecting circuit 14 to the driving circuit 13. Further, predetermined voltage is applied between the predetermined electrode on the stator selected by the driving circuit 13 and the slider and the electrostatic actuator 11 is driven. By repeating such operation, the slider constituting the electrostatic actuator 11 is driven in the predetermined moving direction.

Figure 8:
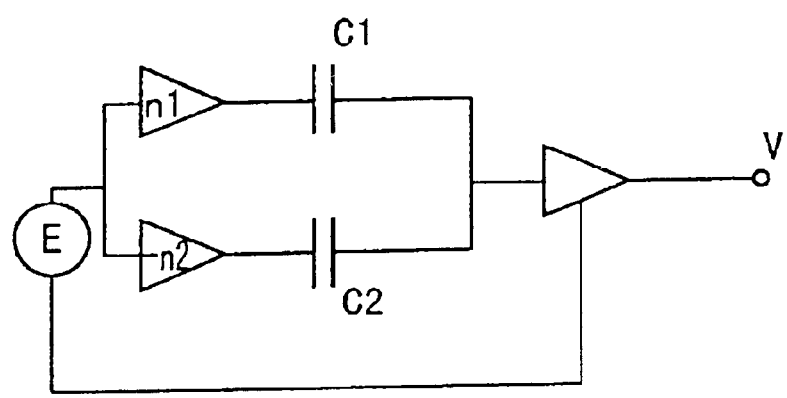
FIG. 8 is a circuit diagram configured to detect electrostatic capacitance of the first embodiment according to the invention.
Figure 9:
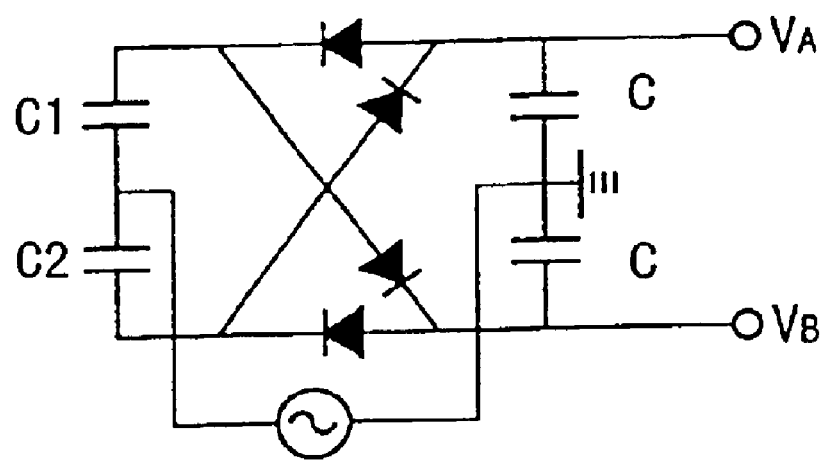
FIG. 9 is a circuit diagram configured to detect electrostatic capacitance of the first embodiment according to the invention.

Here, as the electrostatic capacitance detecting circuit 14, an alternating current bridge circuit shown in FIG. 8 or a capacitance change detecting circuit shown in FIG. 9 is used. According to the circuits in the drawings, since a difference between C1 and C2 is detected, for example, in comparing large or small of C (5c) and C (5d), large or small comparison of both can be carried out by arranging C (5c) to dispose at a position of C1 and C (5d) to dispose at a position of C2.

By measuring the electrostatic capacitances in this way, the relative positions of the electrode portions 8 of the slider 1 and the electrodes 5a, 5b, 6a and 6b of the stators 2 and 3 can be detected and an electrode to be applied with voltage successively can be determined and accordingly, the slider 1 can be moved most efficiently. Therefore, even in the case in which driving force is changed by influence of gravitational force depending on [attitude] altitude and a distance for advancing the slider 1 in one step is changed, moving speed can be accelerated and power consumption can be reduced.

Further, the slider 1 can efficiently be moved regardless of accuracy of the phase difference in arranging the electrodes 5a and 5b provided at the stator 2 and the electrodes 6a and 6b provided at the stator 3 and accordingly, the electrostatic actuator the function of which is not deteriorated by assembling error can be provided.

(Second Embodiment)

Next, an explanation will be given of a second embodiment of the invention in reference to FIG. 10 through FIG. 13.

Figure 10:
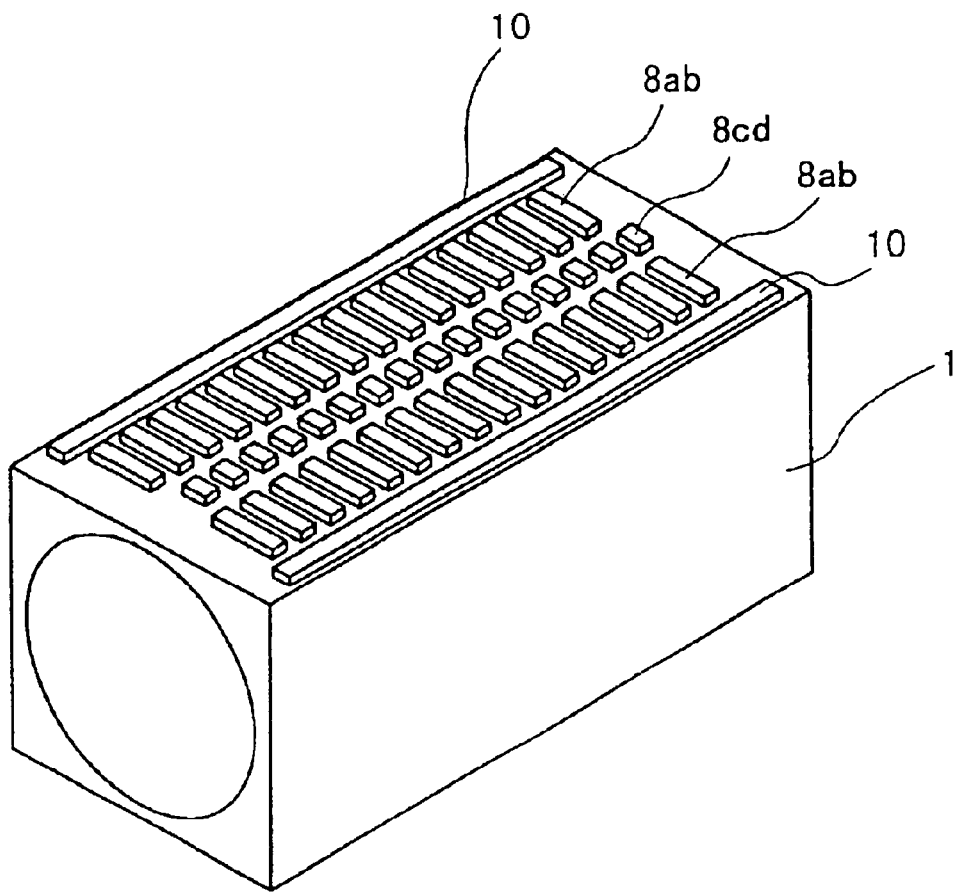
FIG. 10 is a perspective view of a slider showing a second embodiment according to the invention.
Figure 11:
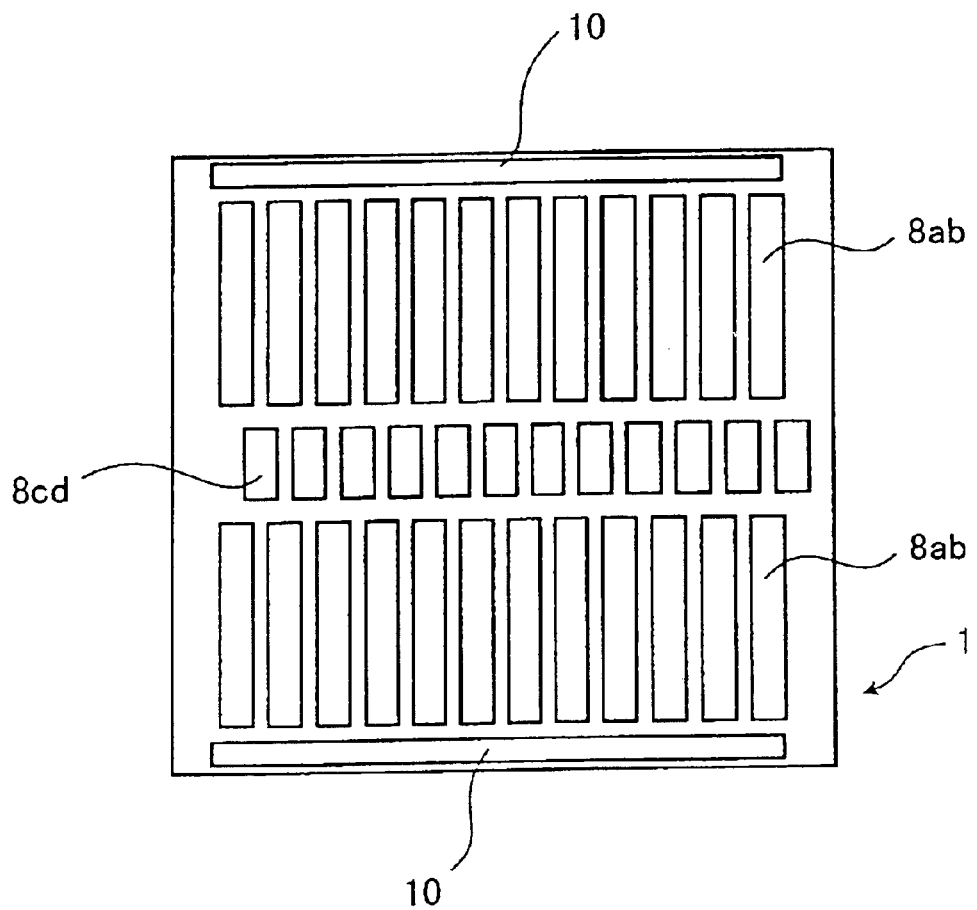
FIG. 11 is a plane view of the slider showing the second embodiment according to the invention.

According to the above-described first embodiment, the slider 1 is provided with only respective one system of the electrode portion 8 or 9 opposed to the electrodes of the stator 2 or 3. In contrast thereto, according to the embodiment, as shown by FIG. 10 and FIG. 11, there are provided first electrode portions 8ab (driving electrode portions) and a second electrode portion 8cd (electrostatic capacitance detecting electrode portions) respectively at a face of the slider 1 opposed to a first electrode row formed by the electrodes 5a and 5b on the stator 2 and a second electrode row formed by the electrodes 5c and 5d. In this case, the first electrode portions 8ab and the second electrode portion 8cd are arranged such that phases of aligning pitches with regard to the moving direction of the slider 1 are shifted from each other by ½.

Similarly, there are arranged first electrode portions 9ab and a second electrode portion 9cd respectively at a face of the slider 1 opposed to a first electrode row formed by the electrodes 6a and 6b on the stator 3 and a second electrode row formed by the electrodes 6c and 6d. The first electrode portions 9ab and the second electrode portion 9cd are arranged such that phases of aligning pitches with regard to the moving direction of the slider 1 are shifted from each other by ½.

Figure 12:
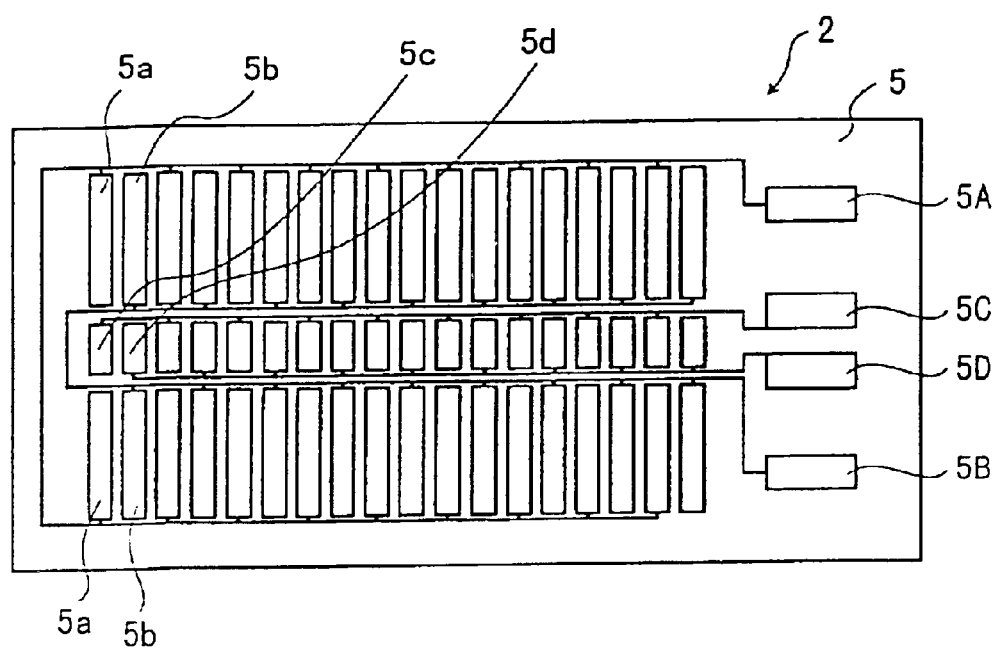
FIG. 12 is a constitution view of stator electrodes showing the second embodiment according to the invention.

In contrast thereto, as shown by FIG. 12, different from the first embodiment, the electrodes 5a and 5b (6a, 6b) and the electrodes 5c and 5d (6c, 6d) on the stator 2 (3) are arranged by aligning the phases.

According to such [constitution] arrangement, by detecting electrostatic capacitance between the electrodes 5c and 5d (6c, 6d) on the stator 2 (3) and the second electrode portion 8cd (9cd) of the slider, the electrodes 5a and 5b (6a, 6b) on the stator 2 (3) to be applied with voltage are selected and by applying voltage between the electrodes and the slider 1, the slider 1 can be driven in the predetermined moving direction.

According to the [constitution] arrangement, operation and effect substantially similar to those of the above-described first embodiment are achieved.

Figure 13:
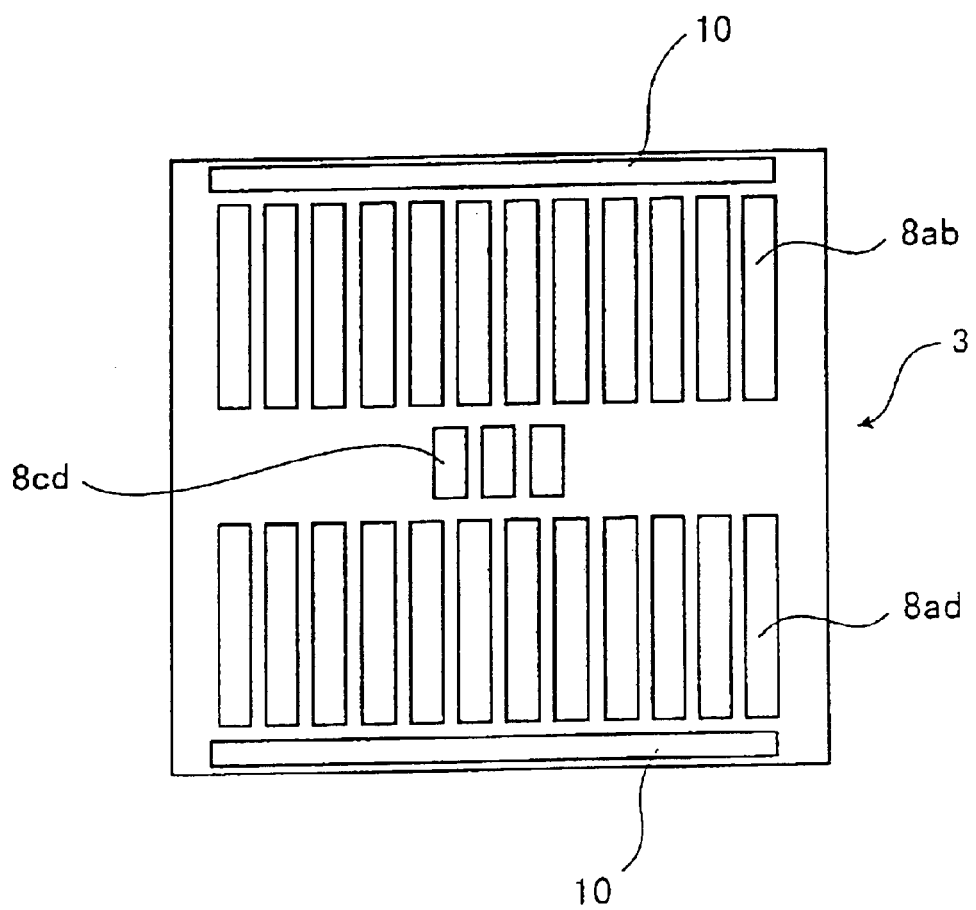
FIG. 13 is a plane view of a slider showing the second embodiment according to the invention.

Further, the second electrode portions 8cd and 9cd may not be necessarily provided by the same numbers [same] as those of the first electrode portions 8ab and 9ab. As shown by FIG. 13, the numbers of the second electrode portions 8cd and 9cd may be smaller than numbers of the first electrode portions 8ab and 9ab. Particularly when the electrode portions 8cd and 9cd are provided configured to measure electrostatic capacitance on the side of the slider 1 as in the embodiment, the numbers of the electrode portions can be set regardless of the stroke of driving the slider 1.

(Third Embodiment)

Next, an explanation will be given of a third embodiment of the invention in reference to FIG. 14 through FIG. 16.

Figure 14:
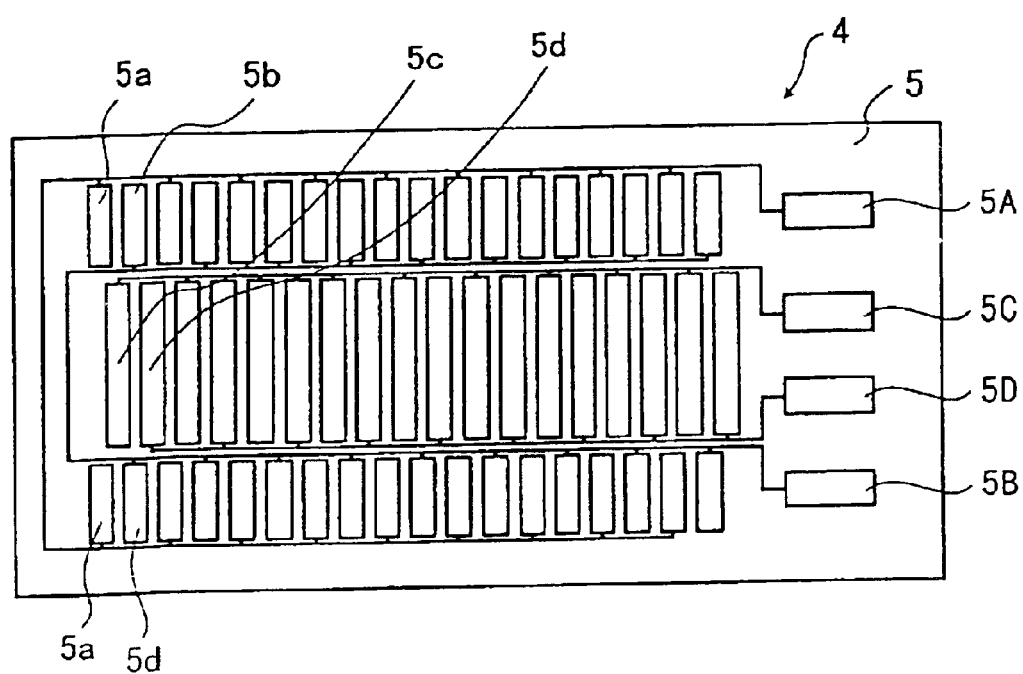
FIG. 14 is a constitution view of electrodes of a stator showing a third embodiment according to the invention.
Figure 15:
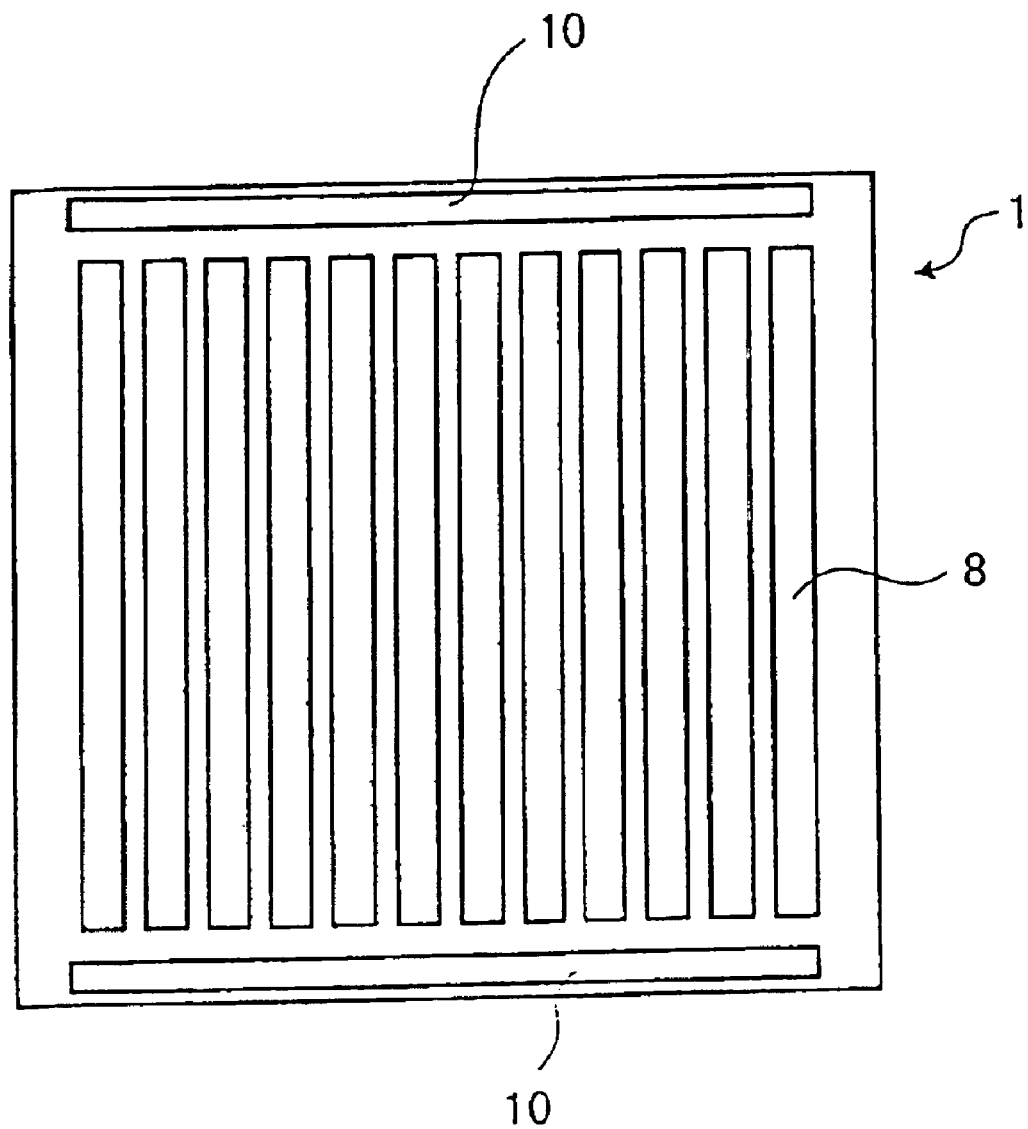
FIG. 15 is a plane view of a slider showing the third embodiment according to the invention.

Although the embodiment is constructed by a constitution substantially the same as that of the above-described second embodiment, as shown by FIG. 14, total areas of the electrodes 5a and 5b and the electrodes 5c and 5d are respectively constituted to be the same. Further, the respective electrodes achieve both of a function as sensors for measuring electrostatic capacitance between the electrodes and the electrode portions 8 of the slider 1 and a function as the electrodes for driving the slider 1. Further, as shown by FIG. 15, the constitution of the electrode portion 8 provided at the slider 1 is similar to that of the above-described first embodiment.

According to the embodiment, electrostatic capacitance C (5a) between the electrode 5a and the electrode portion 8, electrostatic capacitance C (5b) between the electrode 5b and the electrode portion 8 and electrostatic capacitance C (5c) between the electrode 5c and the electrode portion 8 and electrostatic capacitance C (5d) between the electrode 5d and the electrode portion 8, are respectively measured.

Figure 16:
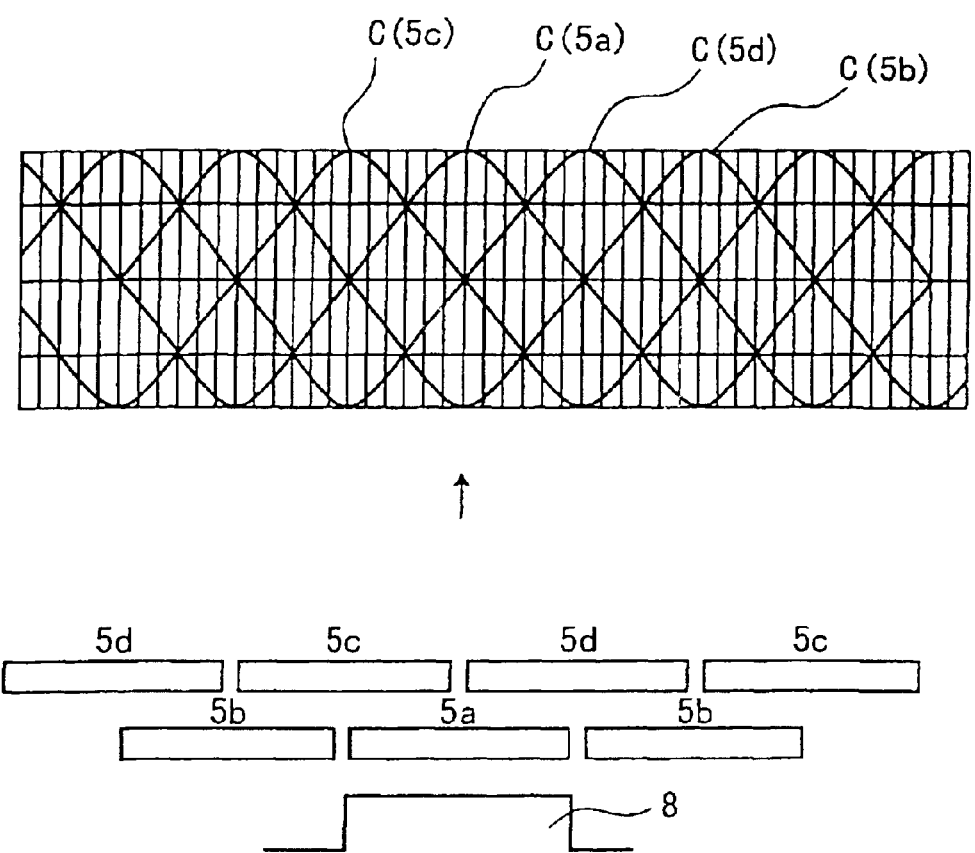
FIG. 16 is a diagram configured to explain a drive pattern showing the third embodiment according to the invention.

As shown by FIG. 16, when the electrode portion 8 of the slider 1 is opposed to the electrode 5a of the stator 2, electrostatic capacitance C (5a) between the electrode 5a and the electrode portion 8 becomes a maximum. Further, at this occasion, distances from the electrodes 5c and 5d to the electrode portion 8 are equal to each other and electrostatic capacitance C (5c) between the electrode 5c and the electrode portion 8 and electrostatic capacitance C (5d) between the electrode 5d and the electrode portion 8 are equal to each other. Further, at this occasion, a distance between the electrode 5b and the electrode portion 8 becomes a maximum and electrostatic capacitance C (5b) between the electrode 5b and the electrode portion 8 becomes a minimum.

Here, when the electrode portion 8 is moved to the right side in accordance with movement of the slider 1, electrostatic capacitances C (5a) and C (5c) are reduced, contrary, electrostatic capacitances C (5b) and C (5d) are increased. When the electrode portion 8 is disposed at the middle of the electrode 5a and the electrode 5b, electrostatic capacitance C (5a) and electrostatic capacitance C (5b) are equal to each other. Further, electrostatic capacitance C (5c) shows a minimum value and electrostatic capacitance C (5d) shows a maximum value.

When the electrode portion 8 is moved further to the right side, electrostatic capacitances C (5a) and C (5d) are reduced, contrary, electrostatic capacitances C (5b) and C (5c) are increased. When the electrode portion 8 is opposed to the electrode 5b, electrostatic capacitance C (5c) and electrostatic capacitance C (5d) are equal to each other. Further, electrostatic capacitance C (5a) shows a minimum value and electrostatic capacitance C (5b) shows a maximum value.

When the electrode portion 8 is moved further to the right side, electrostatic capacitances C (5b) and C (5d) are reduced, contrary, electrostatic capacitances C (5a) and C (5c) are increased. When the electrode portion 8 is disposed at a middle of the electrode 5a and the electrode 5b, electrostatic capacitance C (5a) and electrostatic capacitance C (5b) are equal to each other. Further, electrostatic capacitance C (5d) shows a minimum value and electrostatic capacitance C (5c) shows a maximum value.

When the electrode portion 8 is moved further to the right side, electrostatic capacitances C (5b) and C (5c) are reduced, contrary, electrostatic capacitances C (5a) and C (5d) are increased. Further, the electrode portion 8 is opposed to the electrode 5a again to thereby finish one cycle.

By utilizing the fact that electrostatic capacitance is changed in this way, in driving the slider 1, an electrode to be applied with voltage can be selected. First, when the slider 1 is adsorbed to the stator 3, voltage applied between the electrodes on the stator 3 and the slider 1 is set to 0. Further, when the slider 1 is moved to the right side, voltage is applied to the electrode 5b when the electrostatic capacitance is C (5c)<C (5d), to the electrode 5a when electrostatic capacitance is C (5c)>C (5d), to the electrode 5c when electrostatic capacitance is C (5a)<C (5b) and to the electrode 5d when electrostatic capacitance is C (5a)>C (5b), respectively. Meanwhile, when the slider 1 is moved to the left side, voltage is conversely applied to the electrode 5a when electrostatic capacitance is C (5c)<C (5d), to the electrode 5b when electrostatic capacitance is C (5c)>C (5d), to the electrode 5d when electrostatic capacitance is C (5a)<C (5b) and to the electrode 5c when electrostatic capacitance is C (5a)>C (5b), respectively.

Similarly, although not illustrated, when the slider 1 is adsorbed to the stator 2, voltage applied between the electrode on the stator 2 and the slider 1 is set to 0. Further, when the slider 1 is moved to the right side, voltage is applied to the electrode 6b when electrostatic capacitance is C (6c)<C (6d), to the electrode 6a when electrostatic capacitance is C (6c)>C (6d), to the electrode 6c when electrostatic capacitance is C (6a)<C (6b) and to the electrode 6d when electrostatic capacitance is C (6a)>C (6b), respectively. Meanwhile, when the slider 1 is moved to the left side, voltage is conversely applied to the electrode 6a when electrostatic capacitance is C (6c)<C (6d), to the electrode 6b when electrostatic capacitance is C (6c)>C (6d), to the electrode 6d when electrostatic capacitance is C (6a)<C (6b) and to the electrode 6c when electrostatic capacitance is C (6a)>C (6b), respectively.

Here, when conditions are duplicated, a plurality of corresponding electrodes are simultaneously selected and voltage is applied thereto.

According to the constitution, operation and effect substantially similar to those of the above-described first embodiment are achieved. Further, all of the electrodes 5a through 5d and 6a through 6d provided on the stators 2 and 3 can be used for driving the slider 1, driving force can be promoted and high speed movement can be realized.

(Fourth Embodiment)

Figure 17:
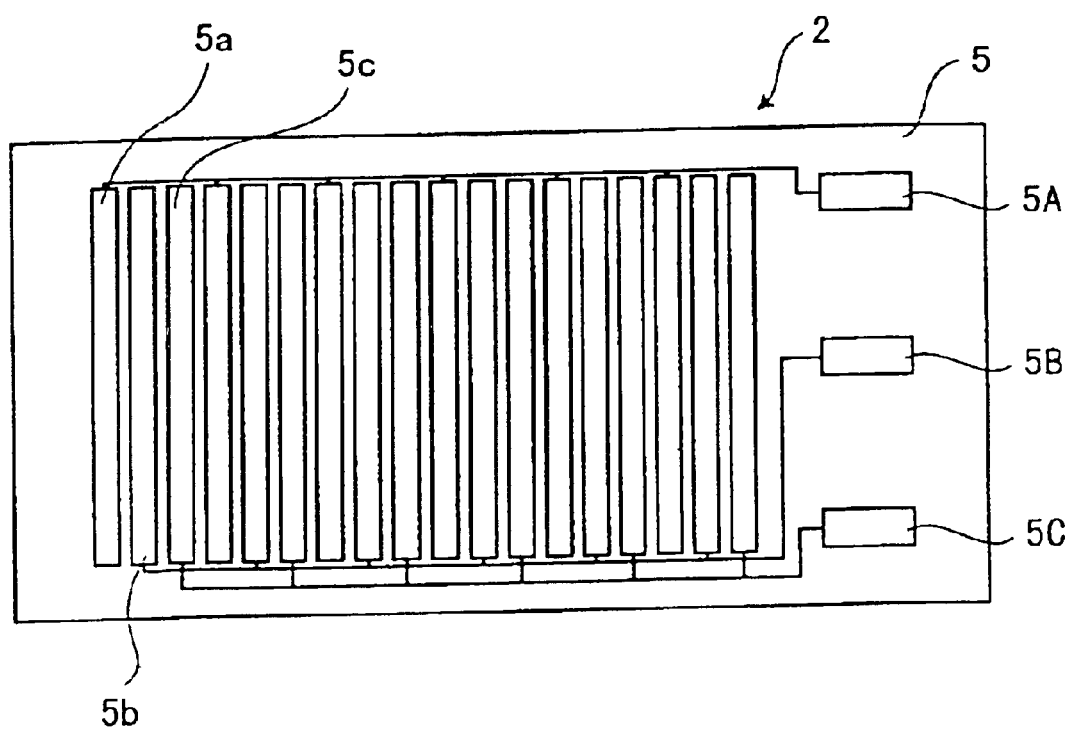
FIG. 17 is a constitution view of electrodes of a stator showing a fourth embodiment according to the invention.

Next, an explanation will be given of a fourth embodiment of the invention in reference to FIG. 17 through FIG. 19. According to the above-described first through third embodiments, two series of the electrodes 5a and 5b or the electrodes 6a and 6b are alternately arranged at one stator as electrodes for driving the slider. In contrast thereto, according to the embodiment, as shown by FIG. 17, three series of electrodes 5a, 5b and 5c are alternately arranged on the stator 2 respectively along the moving direction of the slider 1. Further, although not illustrated, three series of electrodes (6a, 6b, 6c) are arranged also on the stator 3 respectively alternately along the moving direction of the slider 1.

The electrode portions 8 of the slider 1 are provided at a pitch the same as a pitch of one system of the electrodes 5a (5b or 5c) and similarly, electrode portions 9 are provided at a pitch the same as a pitch of one system of electrodes 6a (6b or 6c).

Next, an explanation will be given of operation of the electrostatic actuator according to the embodiment in reference to FIGS. 18A, 18B and 18C and FIG. 19.

Figure 18A:
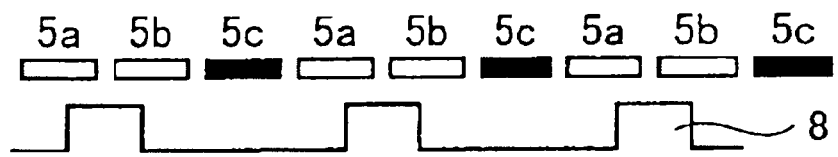
FIGS. 18A, 18B and 18C are diagrams configured to explain a drive pattern showing the fourth embodiment according to the invention.
Figure 18B:
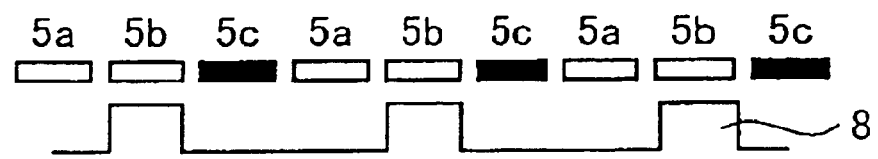
Figure 18C:
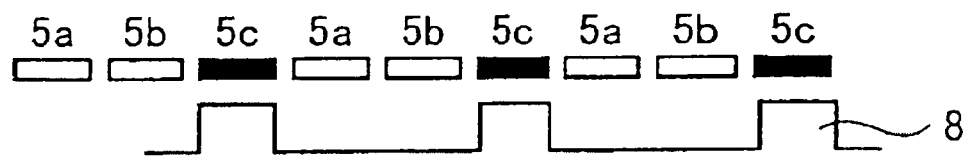

FIGS. 18A, 18B and 18C show a behavior of moving the slider 1 in the moving direction (right side in the drawing). Here, for explanation, only electrodes 5a, 5b and 5c of the one stator 2 and the electrode portions 8 of the slider 1 are schematically shown. When a position of the electrode portion 8 of the slider 1 is brought into a state immediately before FIG. 18C from FIG. 18A by passing through FIG. 18B, when voltage is applied between the electrode 5c and the slider 1, the slider 1 is moved to the right side.

Figure 19:
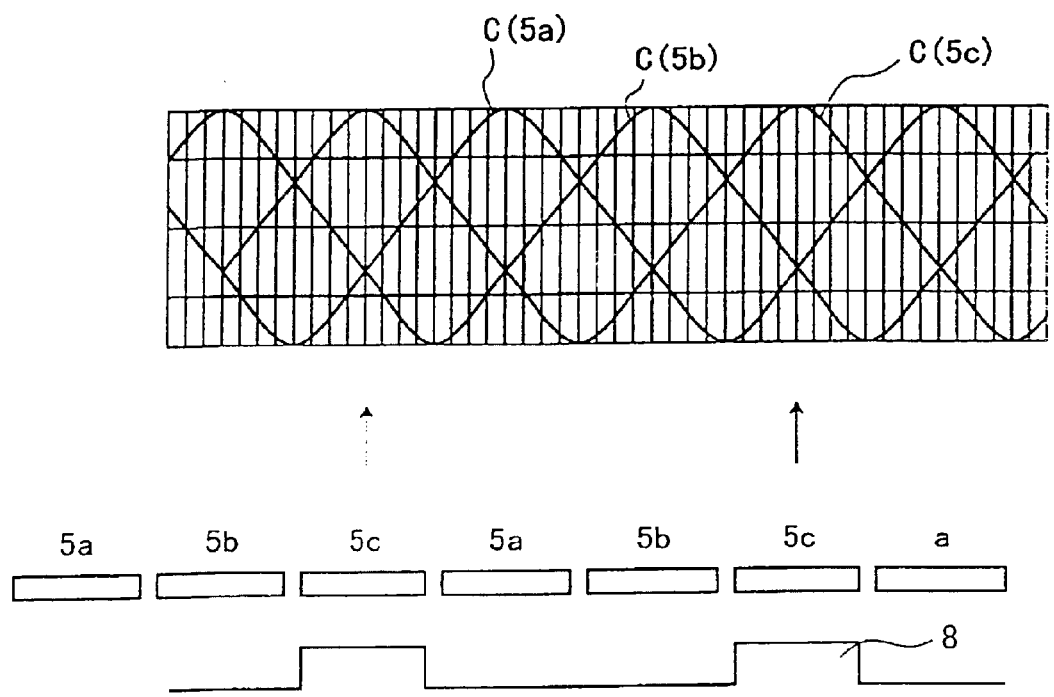
FIG. 19 is a diagram configured to explain the drive pattern showing the fourth embodiment according to the invention.

FIG. 19 shows a relationship between relative positions of respective electrodes on the stator 2 relative to the electrode portion 8 of the slider 1, and electrostatic capacitance between respective electrodes on the stator 2 and the electrode portions 8.

As shown by FIG. 19, when the electrode portion 8 of the slider 1 is opposed to the electrode 5c of the stator 2, electrostatic capacitance C (5a) between the electrode 5c and the electrode portion 8 becomes a maximum. Further, at this occasion, distances from the electrodes 5a and 5b to the electrode portion 8 are equal to each other and electrostatic capacitance C (5a) between the electrode 5a and the electrode portion 8 and electrostatic capacitance C (5b) between the electrode 5b and the electrode portion 8 are equal to each other.

Here, when the electrode portion 8 is moved to the right side in accordance with movement of the slider 1, electrostatic capacitances C (5b) and C (5c) are reduced, contrary, electrostatic capacitance C (5a) is increased. When the electrode portion 8 is disposed at a middle of the electrode 5c and the electrode 5a, electrostatic capacitance C (5c) and electrostatic capacitance C (5a) are equal to each other. Further, electrostatic capacitance C (5b) shows a minimum value.

When the electrode portion 8 is moved further to the right side, electrostatic capacitance C (5c) is reduced, contrary, electrostatic capacitances C (5a) and C (5b) are increased. When the electrode portion 8 is opposed to the electrode 5a, electrostatic capacitance C (5c) and electrostatic capacitance C (5b) are equal to each other. Further, electrostatic capacitance C (5a) shows a maximum value.

When the electrode portion 8 is moved further to the right side, electrostatic capacitances C (5a) and C (5c) are reduced, contrary, electrostatic capacitance C (5b) is increased. When the electrode portion 8 is disposed at a middle of the electrode 5a and the electrode 5b, electrostatic capacitance C (5a) and electrostatic capacitance C (5b) are equal to each other. Further, electrostatic capacitance C (5c) shows a minimum value.

When the electrode portion 8 is moved further to the right side, electrostatic capacitances C (5c) and C (5a) are reduced, contrary, electrostatic capacitance C (5b) is increased. When the electrode portion 8 is opposed to the electrode 5b, electrostatic capacitance C (5a) and electrostatic capacitance C (5c) are equal to each other. Further, electrostatic capacitance C (5b) shows a maximum value.

When the electrode portion 8 is moved further to the right side, electrostatic capacitance C (5b) is reduced, contrary, electrostatic capacitances C (5a) and C (5c) are increased. When the electrode portion 8 is disposed at a middle of the electrode 5b and the electrode 5c, electrostatic capacitance C (5b) and electrostatic capacitance C (5c) are equal to each other. Further, electrostatic capacitance C (5a) shows a minimum value.

When the electrode portion 8 is moved further to the right side, electrostatic capacitance C (5b) is reduced, contrary, electrostatic capacitances C (5a) and C (5c) are increased. Further, the electrode portion 8 and the electrode 5c are opposed to each other again to thereby finish one cycle.

By utilizing the fact that electrostatic capacitance is changed in this way, in driving the slider 1, an electrode to be applied with voltage can be selected. First, when the slider 1 is adsorbed onto the stator 3, voltage applied between the electrodes on the stator 3 and the slider 1 is set to 0. Further, when the slider 1 is moved to the right side, voltage is applied to the electrode 5a when electrostatic capacitance is C (5c)>C (5b), to the electrode 5b when electrostatic capacitance is C (5a)>C (5c) and to the electrode 5c when electrostatic capacitance is C (5b)>C (5a), respectively. Meanwhile, when the slider 1 is moved to the left side, voltage is applied to the electrode 5c when electrostatic capacitance is C (5a)>C (5b), to the electrode 5b when electrostatic capacitance is C (5c)>C (5a) and to the electrode 5a when electrostatic capacitance is C (5b)>C (5c), respectively.

Similarly, although not illustrated, when the slider 1 is adsorbed onto the stator 2, voltage applied between the electrodes on the stator 2 and the slider 1 is set to 0. Further, when the slider 1 is moved to the right side, voltage is applied to the electrode 6a when electrostatic capacitance is C (6c)>C (6b), to the electrode 6b when electrostatic capacitance is C (6a)>C (6c) and to the electrode 6c when electrostatic capacitance is C (6b)>C (6a), respectively. Meanwhile, when the slider 1 is moved to the left side, voltage is applied to the electrode 6c when the electrostatic capacitance is C (6a)>C (6b), to the electrode 6b when electrostatic capacitance is C (6c)>C (6a) and to the electrode 6a when electrostatic capacitance is C (6b)>C (6c), respectively.

Here, when conditions are duplicated, a plurality of corresponding electrodes are simultaneously selected and voltage is applied thereto.

According to the constitution, operation and effect substantially similar to those of the above-described first embodiment are achieved. Further, when three series or more of the electrodes are arranged alternately in this way, a variation in force produced in switching the electrodes can be reduced.

Figure 20:
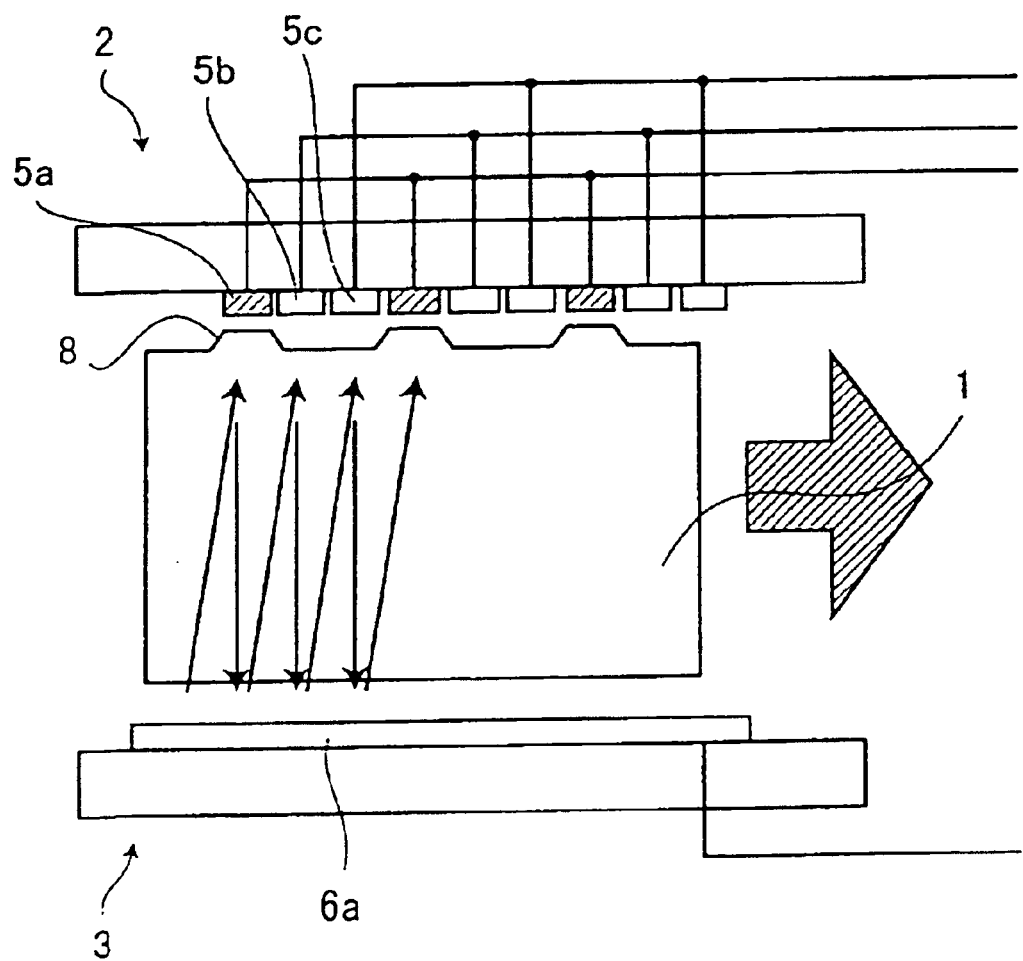
FIG. 20 is a constitution diagram showing a modified example of the fourth embodiment according to the invention.

Further, although according to the embodiment, an explanation has been given of a case in which the stators 2 and 3 are provided with the same electrode constitution, for example, as shown by FIG. 20, there may be constructed a constitution in which three series of electrodes 5a, 5b and 5c are arranged only at the stator 2 and a single system of electrodes 6a are arranged at the stator 3. According to such constitution, operation and effect similar to those of the embodiment can be achieved by pertinently selecting the electrodes and applying voltage thereto by the method of selecting the electrodes on the stator 2 when the slider 1 is adsorbed onto the stator 3.

(Fifth Embodiment)

Figure 21:
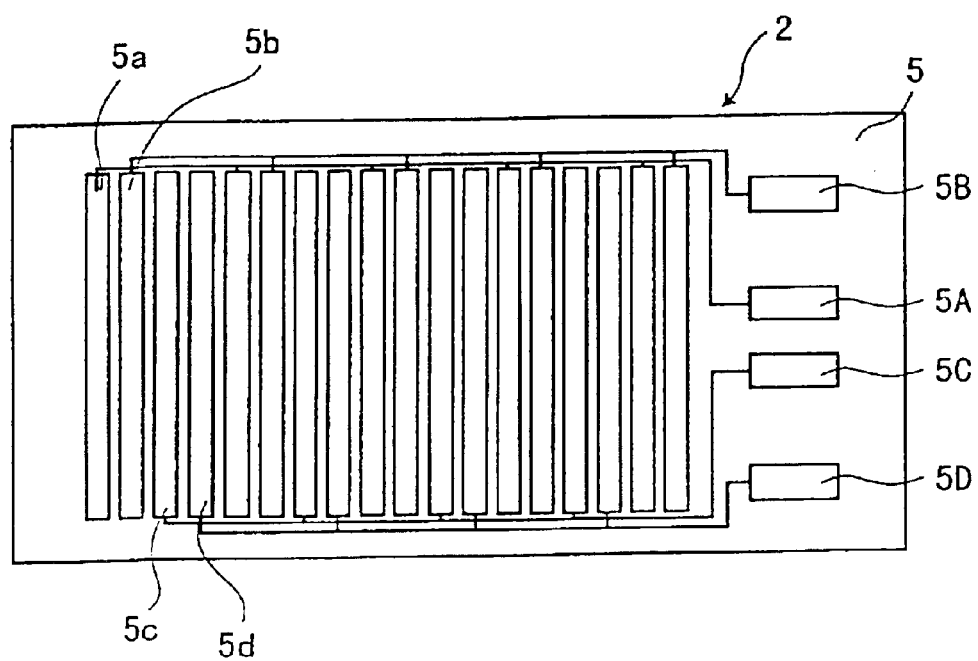
FIG. 21 is a constitution diagram of electrodes of a stator showing a fifth embodiment according to the invention.

Next, an explanation will be given of a fifth embodiment of the invention in reference to FIG. 21 and FIG. 22. The embodiment is constructed by a constitution of further increasing one system of electrodes to the above-described fourth embodiment. That is, four series of electrode 5a, 5b, 5c and 5d are arranged on the stator 2 alternately along the moving direction of the slider 1. Further, although not illustrated, four series of electrodes 6a, 6b, 6c and 6d are arranged also on the stator 3 alternately along the moving direction of the slider 1.

The electrode portions 8 of the slider 1 are provided by a pitch the same as a pitch of one system of the electrodes 5a (5b, 5c or 5d) and similarly, the electrode portions 9 are provided at a pitch the same as a pitch of one system of the electrodes 6a (6b, 6c or 6d). Further, widths of the electrode portions 8 and 9 are substantially equivalent to widths of contiguous twos of the electrodes.

Figure 22:
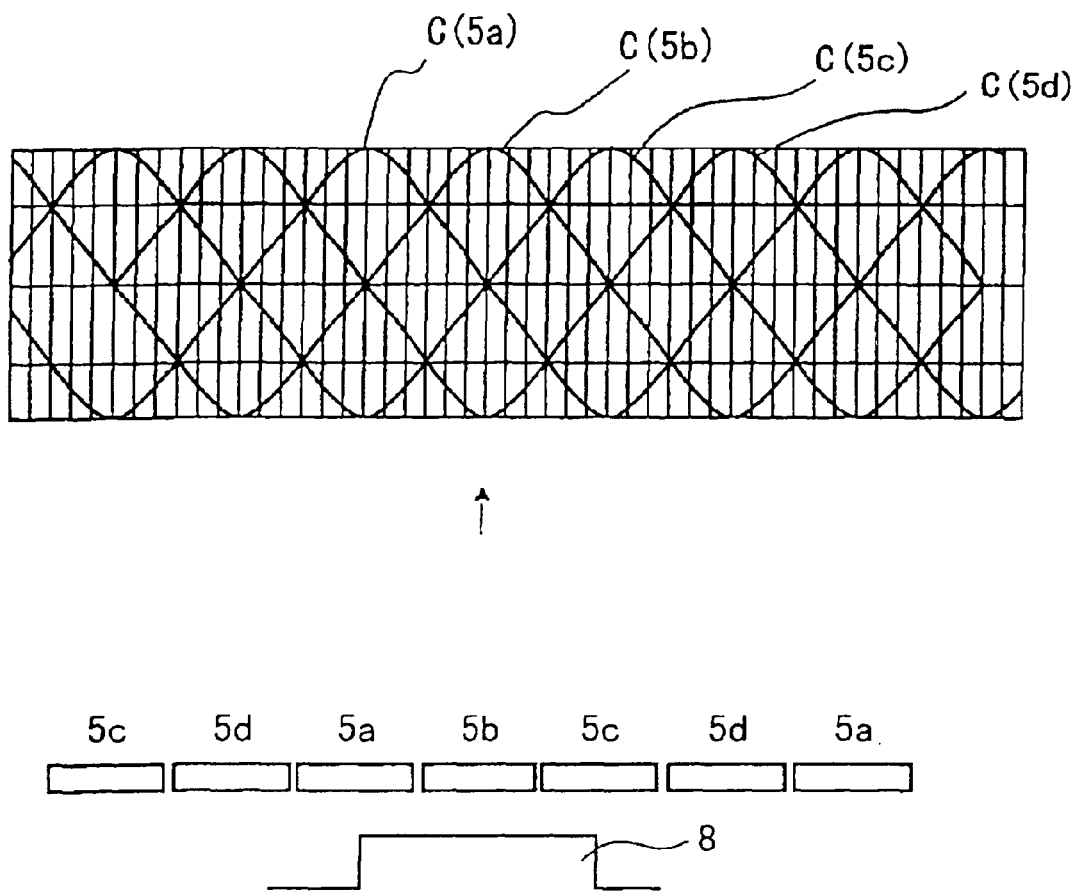
FIG. 22 is a diagram configured to explain a drive pattern showing the fifth embodiment according to the invention.

FIG. 22 shows a relationship between relative positions of respective electrodes on the stator 2 relative to the electrode portions 8 of the slider 1, and electrostatic capacitance between respective electrodes on the stator 2 and the electrode portions 8.

As shown by FIG. 22, when a central portion of the electrode portion 8 of the slider 1 is opposed to the electrode 5b of the stator 2, electrostatic capacitance C (5b) between the electrode 5b and the electrode portion 8 becomes a maximum. Further, at this occasion, distances between the electrodes 5a and 5c and the electrode portion 8 are equal to each other and electrostatic capacitance C (5a) between the electrode 5a and the electrode portion 8 and electrostatic capacitance C (5c) between the electrode 5c and the electrode portion 8 are equal to each other. Further, at this occasion, a distance between the electrode 5d and the electrode portion 8 becomes a maximum and electrostatic capacitance C (5d) between the electrode 5d and the electrode portion 8 becomes a minimum. Here, when the electrode portion 8 is moved to the right side in accordance with movement of the slider 1, electrostatic capacitances C (5a) and C (5b) are reduced, contrary, electrostatic capacitances C (5c) and C (5d) are increased. When the central portion of the electrode portion 8 is opposed to the electrode 5c, electrostatic capacitance C (5b) and electrostatic capacitance C (5d) are equal to each other. Further, electrostatic capacitance C (5a) shows a minimum value and electrostatic capacitance C (5c) shows a maximum value.

When the electrode portion 8 is moved further to the right side, electrostatic capacitances C (5b) and C (5c) are reduced, contrary, electrostatic capacitances C (5a) and C (5d) are increased. When the central portion of the electrode portion 8 is opposed to the electrode 5d, electrostatic capacitance C (5a) and electrostatic capacitance C (5c) are equal to each other. Further, electrostatic capacitance C (5b) shows a minimum value and electrostatic capacitance C (5d) shows a maximum value.

When the electrode portion 8 is moved further to the right side, electrostatic capacitances C (5c) and C (5d) are reduced, contrary, electrostatic capacitances C (5a) and C (5b) are increased. When the central portion of the electrode portion 8 is opposed to the electrode 5a, electrostatic capacitance C (5b) and electrostatic capacitance C (5d) are equal to each other. Further, electrostatic capacitance C (5c) shows a minimum value and electrostatic capacitance C (5a) shows a maximum value.

When the electrode portion 8 is moved further to the right side, electrostatic capacitances C (5a) and C (5d) are reduced, contrary, electrostatic capacitances C (5b) and C (5c) are increased. Further, the central portion of the electrode portion 8 is opposed to the electrode 5b again to thereby finish one cycle.

By utilizing the fact that electrostatic capacitance is changed in this way, in driving the slider 1, an electrode to be applied with voltage can be selected. First, when the slider 1 is adsorbed to the stator 3, voltage applied between the electrodes on the stator 3 and the slider 1 is set to 0. Further, when the slider 1 is moved to the right side, voltage is applied to the electrode 5a when electrostatic capacitance is C (5b)<C (5d), to the electrode 5d when electrostatic capacitance is C (5c)>C (5a), to the electrode 5c when electrostatic capacitance is C (5d)<C (5b) and to the electrode 5b when electrostatic capacitance is C (5a)>C (5c), respectively. Meanwhile, when the slider 1 is moved to the left side, voltage is applied to the electrode 5c when electrostatic capacitance is C (5b)<C (5d), to the electrode 5b when electrostatic capacitance is C (5c)>C (5a), to the electrode 5a when electrostatic capacitance is C (5d)<C (5b) and to the electrode 5d when electrostatic capacitance is C (5a)>C (5c), respectively.

Similarly, although not illustrated, when the slider 1 is adsorbed to the stator 2, voltage applied between the electrodes on the stator 2 and the slider 1 is set to 0. Further, when the slider is moved to the right side, voltage is applied to the electrode 6a when electrostatic capacitance is C (6b)<C (6d), to the electrode 6d when electrostatic capacitance is C (6c)>C (6a), to the electrode 6c when electrostatic capacitance is C (6d)<C (6b) and to the electrode 6b when electrostatic capacitance is C (6a)>C (6c), respectively. Meanwhile, when the slider 1 is moved to the left side, voltage is conversely applied to the electrode 6c when electrostatic capacitance is C (6b)<C (6d), to the electrode 6b when electrostatic capacitance is C (6c)>C (6a), to the electrode 6a when electrostatic capacitance is C (6d)<C (6b) and to the electrode 6d when electrostatic capacitance is C (6a)>C (6c), respectively. Here, when conditions are duplicated, a plurality of corresponding electrodes are simultaneously selected and voltage is applied thereto.

According to such constitution, operation and effect substantially similar to those of the above-described first embodiment are achieved. Further, when four series or more of the electrodes are alternately arranged in this way, the variation in force produced in switching the electrodes can further be reduced.

(Sixth Embodiment)

Figure 23:
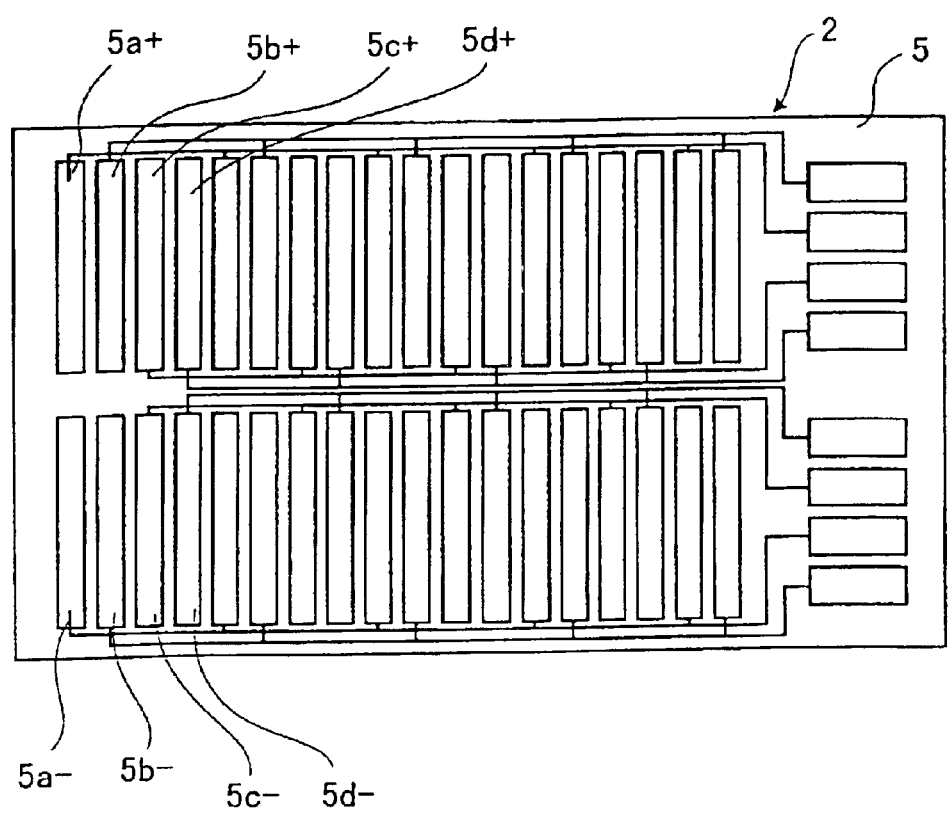
FIG. 23 is a constitution diagram of electrodes of a stator showing a sixth embodiment according to the invention.

Next, an explanation will be given of a sixth embodiment of the invention in reference to FIG. 23 and FIG. 24. Although the embodiment is constructed by a constitution substantially the same as that of the fifth embodiment, there are formed a first electrode group arranged with electrodes 5a+, 5b+, 5c+ and 5d+ alternately along the movement direction of the slider 1 and a second electrode group arranged with electrodes 5a–, 5b–, 5c– and 5d– alternately along the movement direction of the slider 1, on the stator 2 (refer to FIG. 23). In this case, the first electrode group and the second electrode group are provided in parallel with each other in the same phase.

Similarly, although not illustrated, there are formed a first electrode group arranged with electrodes 6a+, 6b+, 6c+ and 6d+ alternately along the movement direction of the slider 1 and a second electrode group arranged with the electrodes 6a–, 6b–, 6c– and 6d– alternately along the movement direction of the slider 1, on the stator 3. Also in this case, the first electrode group and the second electrode group are provided in parallel with each other in the same phase.

Although according to the above-described respective embodiments, electrostatic capacitances between the electrode portions 8 of the slider 1 and the electrodes on the stators 2 and 3 are measured, according to the embodiment, electrodes to be applied with voltage on the stators 2 and 3 are selected without directly measuring the electrostatic capacitances.

Figure 24:
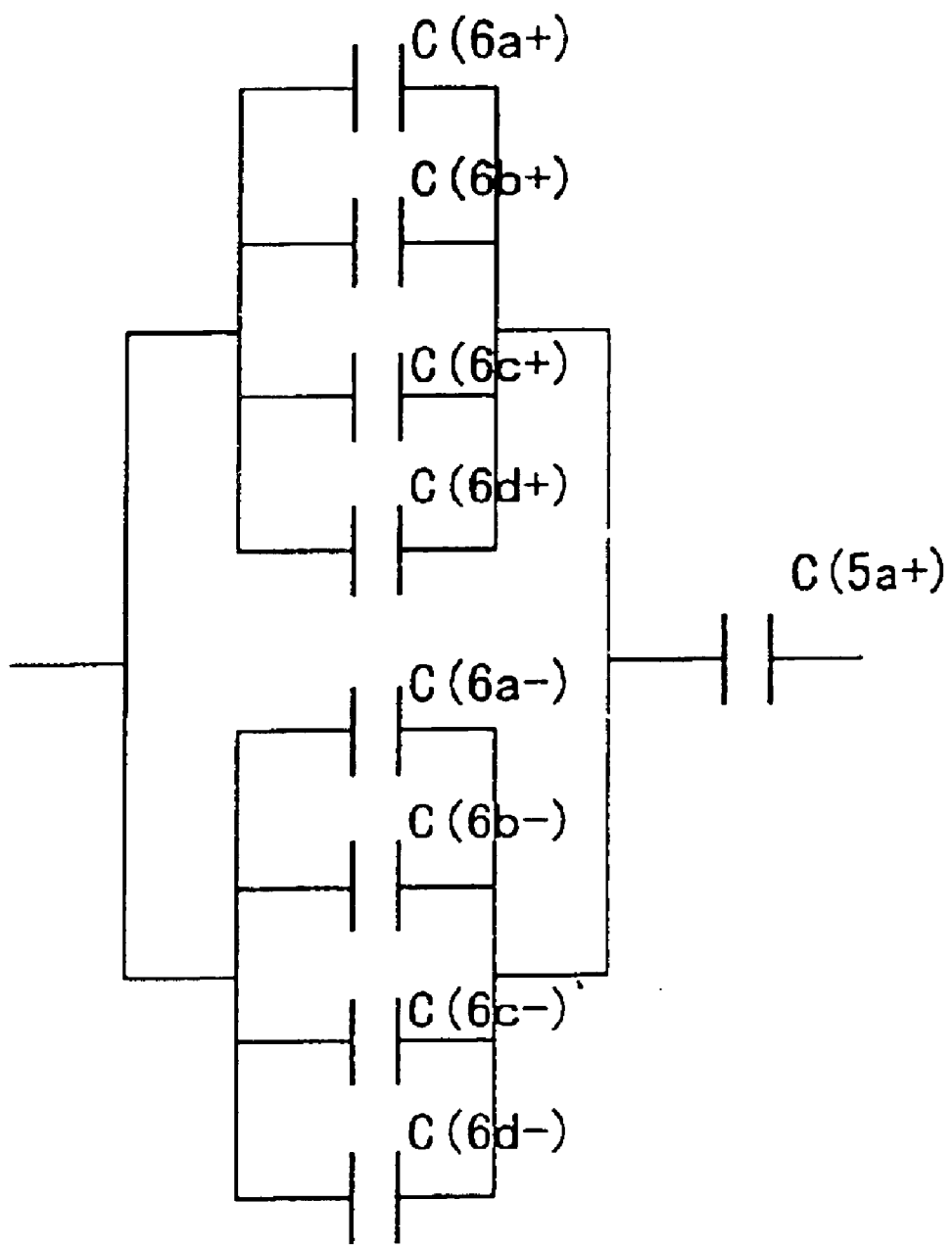
FIG. 24 is a diagram configured to explain electrostatic capacitance showing the sixth embodiment according to the invention.

In this case, as shown by FIG. 24, electrostatic capacitance CC (5a+) of a point of connecting all of the electrodes on the side of the stator 3 and the electrode 5a+ on the side of the stator 2, is as follows.

CC (5a+) =(C(6).C (5a+))/(C(6)+C (5a+)) here, C (6)=C (6a+)+C (6b +)+C (6c +)+C (6d +)+C (6a−)+C (6b−)+C (6c−)+C (6d−) When the slider 1 is disposed on the side of the stator 3, since a gap therebetween is narrow, C (6)>>C (5a+) therefore, CC (5a+)≅:C (5a+) Therefore, by measuring the electrostatic capacitance CC(5a+) of the point of connecting all of the electrodes on the side of the stator 3 and the electrode 5a+, the electrostatic capacitance C (5a+) between the electrode 5a+ and the electrode portion 8 of the slider 1 can be known.

Similarly, electrostatic capacitance between other electrode and the electrode portion 8 of the slider 1 can also be measured. Further, by calculating the electrostatic capacitance of the point of connecting all of the electrodes on the side of the stator 2 and the electrode on the side of the stator 3, electrostatic capacitance between respective electrode on the side of the stator 3 and the electrode portion 8 of the slider 1 can be known.

The method of measuring the electrostatic capacitance between the stator 2 (3) and the slider 1 in this way, is applicable to the above-described respective embodiments.

Next, an explanation will be given of a method of driving the electrostatic actuator according to the embodiment. Although according to the above-described respective embodiments, by applying voltage between electrodes of the stators 2 and 3 and the slider 1, the slider 1 is driven by utilizing the electrostatic force, according to the embodiment, by providing two kinds of electrode groups on the side of the stator as described above, and applying voltage such that one of the corresponding electrodes (for example, electrode 5a+ and electrode 5a−) becomes + and other becomes −, by electrostatic force produced between both of the electrodes, the slider 1 is attracted and driven in the predetermined movement direction. According to such driving method, voltage is not applied to the slider 1 and therefore, lead wire 7 is dispensed with and wireless formation of the slider 1 is achieved. Further, according to the above-described method of measuring electrostatic capacitance, voltage is not applied to the slider and therefore, the method is particularly suitable to the electrostatic actuator having the constitution according to the embodiment.

Next, an explanation will be given of a method of driving the slider 1 by using electrostatic capacitance measured by the above-described method. The constitution of the embodiment is substantially the same as the constitution of the above-described fifth embodiment and a relationship between relative positions of the respective electrodes on the stator 2 relative to the electrode portion 8 of the slider 1, and electrostatic capacitance between the electrodes on the stator 2 and the electrode portion 8, is similar to that in FIG. 22. Further, electrodes constituting sensors for measuring electrostatic capacitance may be of either or both of the first electrode group and the second electrode group, an explanation will be given here as the electrodes of the first electrode group.

First, when the slider 1 is adsorbed to the stator 3, voltage applied on the electrodes on the stator 3 is set to 0. Further, in the case of moving the slider 1 to the right side, when electrostatic capacitance is C (5d+)>C (5b+), +V is applied to the electrode 5a+ and −V is applied to the electrode 5a−, when electrostatic capacitance is C (5a+)>C (5c+), +V is applied to the electrode 5b+ and −V is applied to the electrode 5b−, when electrostatic capacitance is C (5b+)>C (5d+), +V is applied to the electrode 5c+ and −V is applied to the electrode 5c− and when electrostatic capacitance is C (5c+)>C (5a+), +V is applied to the electrode 5d+ and −V is applied to the electrode 5d−, respectively.

Meanwhile, when the slider 1 is adsorbed to the stator 2, voltage applied to the electrodes on the stator 2 is set to 0. Further, in the case of moving the slider 1 to the right side, when electrostatic capacitance is C (6d+)>C (6b+), +V is applied to the electrode 6a+ and −V is applied to the electrode 6a−, when electrostatic capacitance is C (6a+)>C (6c+), +V is applied to the electrode 6b+ and −V is applied to the electrode 6b−, when electrostatic capacitance is C (6b+)>C (6d+), +V is applied to the electrode 6c+ and −V is applied to the electrode 6c− and when electrostatic capacitance is C (6c+)>C(6a+), +V is applied to the electrode 6d+ and −V is applied to the electrode 6d−, respectively.

According to such constitution, operation and effect substantially similar to those of the above-described first embodiment are achieved.

(Seventh Embodiment)

Next, an explanation will be given of an application example utilizing the electrostatic actuator according to the invention in reference to FIG. 25.

The electrostatic actuator according to the invention is suitable for being utilized in a focal point adjusting mechanism of a small-sized camera since the electrostatic actuator is small-sized and excellent in driving characteristic.

Figure 25:
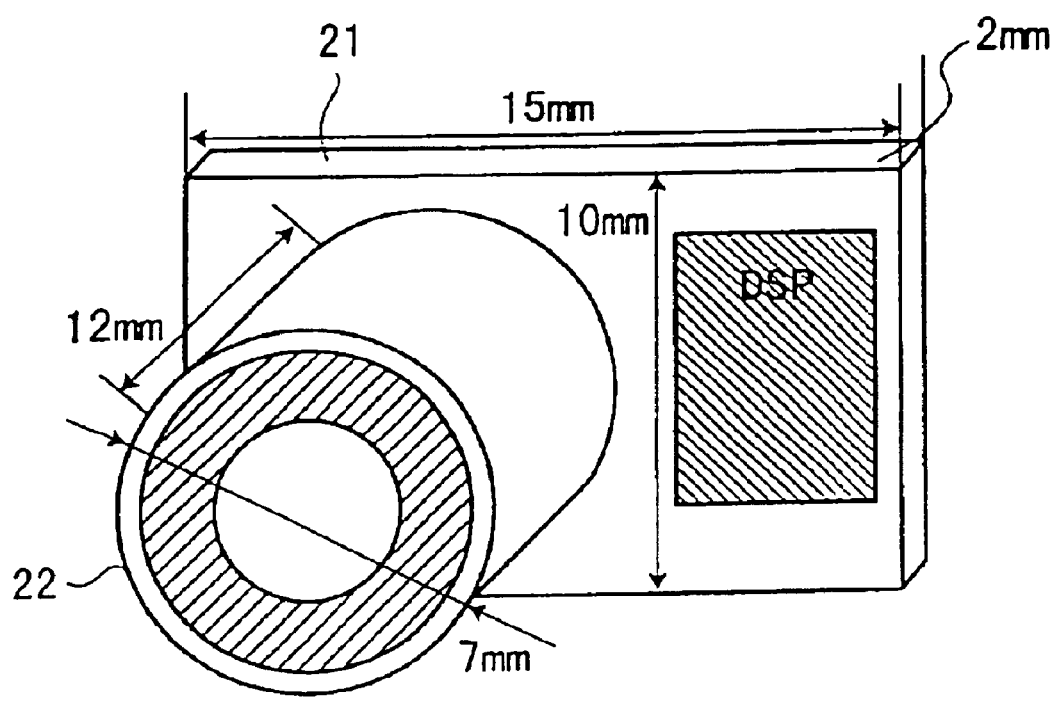
FIG. 25 is a view showing an example of utilizing an electrostatic actuator according to the invention.
Figure 26:
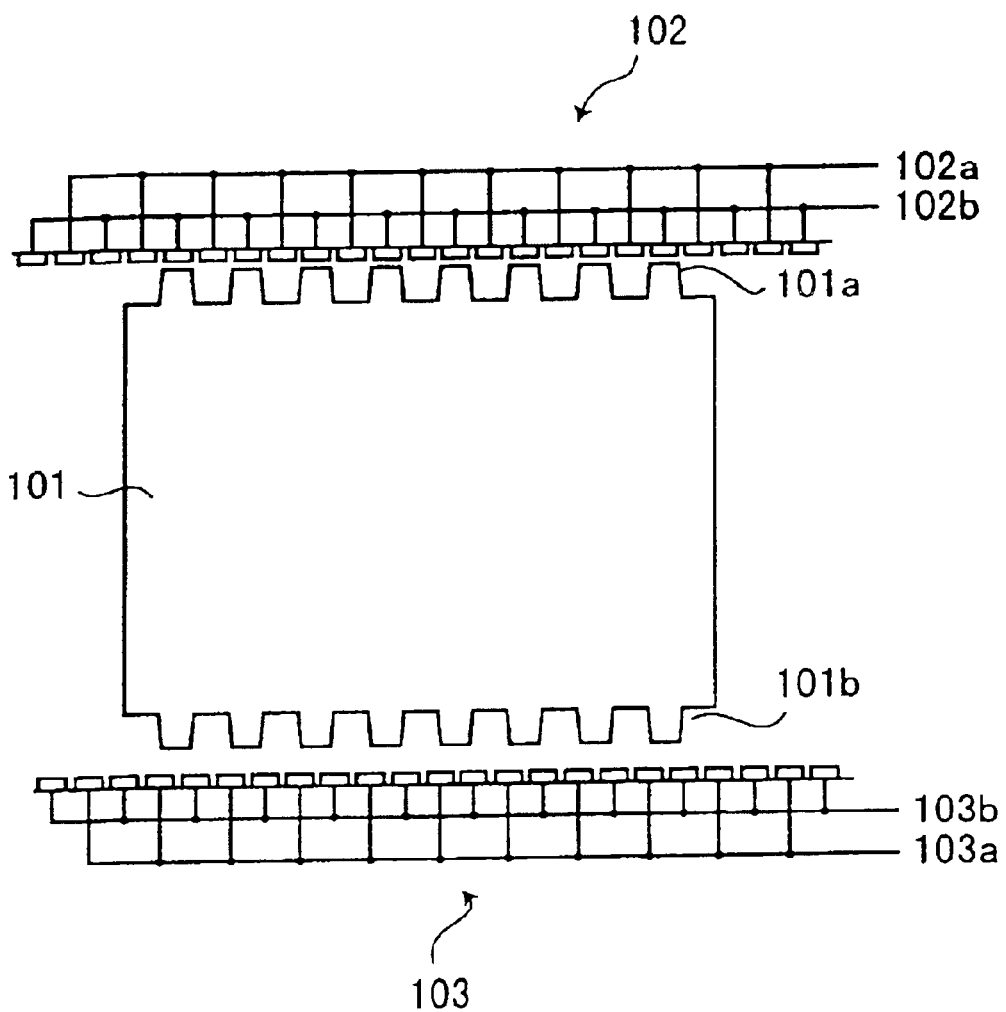
FIG. 26 is a constitution view of a conventional electrostatic actuator.

FIG. 25 shows a module portion of a small-sized camera mounted with the electrostatic actuator according to the invention, there are provided photographing elements of CMOS or CCD on a substrate 21 and an electrostatic actuator 22 is provided thereon. In this case, the above-described lens integral type is used for a slider constituting the electrostatic actuator. Further, IC of DSP or the like configured to control to drive the electrostatic actuator is mounted on the substrate 21.

Such a camera module is used as a camera unit of a portable telephone or a digital camera.

As has been explained above, according to the invention, the electrostatic actuator realizing efficient driving operation, easy to fabricate and excellent in mass production performance can be provided and the small-sized camera module utilizing the electrostatic actuator can also be provided.

What is claimed is:

1. A camera module comprising:
   photographing elements;
   an electrostatic actuator connected to the photographing elements, the electrostatic actuator comprising,
   first and second electrode portions arranged at predetermined intervals, each portion including one or more series of electrodes arranged successively in a predetermined direction,
   a slider disposed between the first and second electrode portions having electrode portions at side faces opposed to the first and second electrode portions and movable in the predetermined direction,
   an electrostatic capacitance detecting circuit configured to detect electrostatic capacitances between the one or more series of electrodes of one of the first and second electrode portions and the electrode portions of the slider, and a driving circuit configured to drive the slider in the predetermined direction by applying voltages between selected series of electrodes of one of the first and the second electrode portions and the electrode portions of the slider, said selected series of electrodes being selected based on a detected result of the electrostatic capacitance detecting circuit; and a controller configured to control the driving circuit of the electrostatic actuator, wherein the first and second electrode portions comprise:

driving electrodes configured to drive the slider, and electrostatic capacitance detecting electrodes configured to detect the electrostatic capacitances, and wherein the driving electrodes are shifted by a half of an alignment pitch along the predetermined direction from the electrostatic capacitance detecting electrodes.

2. A camera module comprising:

photographing elements;

an electrostatic actuator connected to the photographing elements, said electrostatic actuator comprising, first and second electrode portions arranged at predetermined intervals, the first electrode portion including three or more series of electrodes arranged successively in the predetermined direction and said second electrode portion including a single series of electrodes extended in a predetermined direction, a slider disposed between the first and second electrode portions and having electrode portions at side faces opposed to the first electrode portion and movable in the predetermined direction, an electrostatic capacitance detecting circuit configured to detect electrostatic capacitances between the three or more series of electrodes of the first electrode portion and the electrode portions of the slider, and a driving circuit configured to drive the slider in the predetermined direction by applying voltages between selected series of electrodes of one of the first and second electrode portions and the electrode portions of the slider, said selected series of electrodes being selected based on a detected result of the electrostatic capacitance detecting circuit; and a controller configured to control the driving circuit of the electrostatic actuator, wherein the first and second electrode portions comprise:

driving electrodes configured to drive the slider, and electrostatic capacitance detecting electrodes configured to detect the electrostatic capacitances, and wherein the driving electrodes are shifted by a half of an alignment pitch along the predetermined direction from the electrostatic capacitance detecting electrodes.

3. A camera module comprising:

photographing elements;

an electrostatic actuator connected to the photographing elements, said electrostatic actuator comprising, first and second electrode portions arranged at predetermined intervals, each electrode portion including a plurality of series of electrodes arranged successively in a predetermined direction, a slider disposed between the first and second electrode portions and having electrode portions at side faces opposed to the first and second electrode portions and movable in the predetermined direction, an electrostatic capacitance detecting circuit configured to detect an electrostatic capacitance between the one series of electrodes of either the first electrode portion or the second electrode portion and the electrode portions of the slider, and a driving circuit configured to drive the slider in the predetermined direction by applying voltages between selected series of electrodes of the first and second electrode portions and the electrode portions of the slider, said selected series of electrodes being selected based on a detected result of the electrostatic capacitance detecting circuit; and a controller configured to control the driving circuit of the electrostatic actuator, wherein the first and second electrode portions comprise:

driving electrodes configured to drive the slider, and electrostatic capacitance detecting electrodes configured to detect the electrostatic capacitances, and wherein the driving electrodes are shifted by a half of an alignment pitch along the predetermined direction from the electrostatic capacitance detecting electrodes.

4. A camera module comprising:

photographing elements;

an electrostatic actuator connected to the photographing elements, the electrostatic actuator comprising, first and second electrode portions arranged at predetermined intervals, each electrode portion including one or more series of electrodes arranged successively in a predetermined direction, a slider disposed between the first and second electrode portions and having electrode portions at side faces opposed to the first and second electrode portions and movable in the predetermined direction, an electrostatic capacitance detecting circuit configured to detect electrostatic capacitances between each one or more series of electrodes of one of the first electrode portion or the second electrode portion and the electrode portions of the slider, and a driving circuit configured to drive the slider in the predetermined direction by applying voltages between selected series of electrodes of one of the first and second electrode portions and the electrode portions of the slider, said selected series of electrodes being selected based on a detected result of the electrostatic capacitance detecting circuit; and a controller configured to control the driving circuit of the electrostatic actuator, wherein the electrode portions of the slider are provided along the predetermined direction and comprises:

driving electrode portions configured to drive the slider, and electrostatic capacitance detecting electrode portions configured to drive the electrostatic capacitances, and wherein the driving electrode portions are shifted by a half of an alignment pitch along the predetermined direction from the electrostatic capacitance detecting electrode portions.

5. A camera module comprising:

photographing elements;

an electrostatic actuator connected to the photographing elements, said electrostatic actuator comprising, first and second electrode portions arranged at predetermined intervals, the first electrode portion including three or more series of electrodes arranged successively in the predetermined direction and said second electrode portion including a single series of electrodes extended in a predetermined direction, a slider disposed between the first and second electrode portions and having electrode portions at side faces opposed to the first electrode portion and movable in the predetermined direction, an electrostatic capacitance detecting circuit configured to detect electrostatic capacitances between the three or more series of electrodes of the first electrode portion and the electrode portions of the slider, and a driving circuit configured to drive the slider in the predetermined direction by applying voltages between selected series of electrodes of one of the first and second electrode portions and the electrode portions of the slider, said selected series of electrodes being selected based on a detected result of the electrostatic capacitance detecting circuit; and a controller configured to control the driving circuit of the electrostatic actuator, wherein the electrode portions of the slider are provided along the predetermined direction and comprises:

driving electrode portions configured to drive the slider, and electrostatic capacitance detecting electrode portions configured to drive the electrostatic capacitances, and wherein the driving electrode portions are shifted by a half of an alignment pitch along the predetermined direction from the electrostatic capacitance detecting electrode portions.

6. A camera module comprising:

photographing elements;

an electrostatic actuator connected to the photographing elements, said electrostatic actuator comprising, first and second electrode portions arranged at predetermined intervals, each electrode portion including a plurality of series of electrodes arranged successively in a predetermined direction, a slider disposed between the first and second electrode portions and having electrode portions at side faces opposed to the first and second electrode portions and movable in the predetermined direction, an electrostatic capacitance detecting circuit configured to detect an electrostatic capacitance between the one series of electrodes of either the first electrode portion or the second electrode portion and the electrode portions of the slider, and a driving circuit configured to drive the slider in the predetermined direction by applying voltages between selected series of electrodes of the first and second electrode portions and the electrode portions of the slider, said selected series of electrodes being selected based on a detected result of the electrostatic capacitance detecting circuit; and a controller configured to control the driving circuit of the electrostatic actuator, wherein the electrode portions of the slider are provided along the predetermined direction and comprises:

driving electrode portions configured to drive the slider, and electrostatic capacitance detecting electrode portions configured to drive the electrostatic capacitances, and wherein the driving electrode portions are shifted by a half of an alignment pitch along the predetermined direction from the electrostatic capacitance detecting electrode portions.

* * * * *